United States Patent
Maeda et al.

(10) Patent No.: US 7,562,990 B2
(45) Date of Patent: Jul. 21, 2009

(54) REFLECTOR FOR LIGHTING AND BACK LIGHT DEVICE FOR DISPLAYING INFORMATION

(75) Inventors: Yukihiro Maeda, Otsu (JP); Kozo Takahashi, Otsu (JP); Tadami Matsuyama, Ibaraki (JP)

(73) Assignee: Toray Industries, Inc. (JP)

( * ) Notice: Subject to any disclaimer, the term of this patent is extended or adjusted under 35 U.S.C. 154(b) by 337 days.

(21) Appl. No.: 10/585,835

(22) PCT Filed: Jan. 12, 2005

(86) PCT No.: PCT/JP2005/000217

§ 371 (c)(1), (2), (4) Date: Jul. 12, 2006

(87) PCT Pub. No.: WO2005/068899

PCT Pub. Date: Jul. 28, 2005

(65) Prior Publication Data

US 2008/0123352 A1    May 29, 2008

(30) Foreign Application Priority Data

Jan. 13, 2004   (JP) .............................. 2004-005367
Jan. 27, 2004   (JP) .............................. 2004-017975

(51) Int. Cl.
    *G02B 5/12*    (2006.01)

(52) U.S. Cl. ..................................................... 359/515
(58) Field of Classification Search ................. 359/515, 359/528; 349/61, 62, 65, 70; 362/341
    See application file for complete search history.

(56) References Cited

U.S. PATENT DOCUMENTS 6,683,720 B2 *   1/2004   Yoshida et al. .............. 359/599

FOREIGN PATENT DOCUMENTS

| JP | 62-69423 | | 5/1987 |
| JP | 4-323687 | A | 11/1992 |
| JP | 6-67174 | A | 3/1994 |
| JP | 3043515 | U | 9/1997 |
| JP | 10-125119 | A | 5/1998 |
| JP | 2002-372933 | A | 12/2002 |

* cited by examiner

*Primary Examiner*—Euncha P Cherry
(74) *Attorney, Agent, or Firm*—DLA Piper LLP (US)

(57) ABSTRACT

A reflector for lighting has shape holding property, flexibility and lightweight property. That is, a reflector for lighting includes: a reflective material made of a polymer membrane of which an average reflectance of 400 to 700 nm wavelength of at least one surface side is 85% or more and having a ridge-shaped uneven shape; and a reinforcing material having flexibility, and the reinforcing material connects the bottom parts of concave parts with each other from the back side of the one surface side of the reflective material to reinforce the uneven shape.

11 Claims, 40 Drawing Sheets

REFLECTOR FOR LIGHTING AND BACK LIGHT DEVICE FOR DISPLAYING INFORMATION

TECHNICAL FIELD

This disclosure relates to a reflector for lighting for reflecting and distributing light from a light source.

BACKGROUND ART

A metal of which the surface is finished as a mirror surface, an interface generated by voids or the like, and a polymer membrane or the like using a laminated structure of a transparent dielectric for reflection has been known as a reflective material of a reflector for lighting. The polymer membrane has a small influence of degradation due to temperature and humidity or the like, and a reflective material having lightweight and good reflective efficiency can be obtained. Furthermore, since the polymer membrane or the like using the interface generated by the voids has excellent characteristic such as easy supply of uniform light by using diffuse reflection, the polymer membrane has been positively used as a reflective material for lighting having a large area and the necessity of uniform shining such as a back light device for displaying information.

As a three-dimensional structure material using the conventional polymer membrane material, for example, the three-dimensional structure obtained by bonding the polymer membrane on an aluminum plate and bending the aluminum plate has been disclosed in Japanese Patent Application Laid-Open (JP-A) No. 11-198284 (paragraphs [0022] to [0045]) as the reflector for lighting. The structure material is strong and can hold the shape firmly. However, when a product receives an external force during a processing process and transportation or the like, distortion tends to remain in the product shape, and it is difficult to exhibit an optical performance at the time of the design. In addition, it is also difficult to install the product on a frame. The weight is heavy, and it is difficult to realize a complicated shape which is formed by deeply bending and in which various shape is compounded.

For example, in Japanese Patent Application Laid-Open (JP-A) No. 2003-22701 (paragraphs [0012] to [0018]), one obtained by bending and processing a white polymer membrane having a thickness of about 1 mm has been disclosed. However, the structure material had problems that the raw material tends to be fractured when a bent part thereof is bent deeply or extended at the time of a processing process and installation, and stress distortion tends to remain in a film material, and thereby it is difficult to maintain highly precise shape.

It could therefore be helpful to provide a reflector for lighting which has shape holding property, flexibility and lightweight property.

SUMMARY

We provide the following:

[1] A reflector for lighting comprising:
  a reflective material 1 made of a polymer membrane of which an average reflectance of 400 to 700 nm wavelength of at least one surface side is 85% or more and having a ridge-shaped uneven shape; and
  a reinforcing material having flexibility,
  wherein the reinforcing material connects the bottom parts of concave parts with each other from the back side of the one surface side of the reflective material 1 to reinforce the uneven shape (a reflector for lighting of the first aspect).

[2] The reflector for lighting according to the above item [1], wherein the reflective material 1 and the reinforcing material are made of a polyester film.

[3] The reflector for lighting according to the above item [1] or [2], wherein the reflective material 1 has a groove formed on at least a back side of an edge line part of a convex part.

[4] The reflector for lighting according to any of the above items [1] to [3], wherein the reflector contains a plurality of reflective materials.

[5] The reflector for lighting according to the above item [4], wherein the reflector contains a plurality of reflective materials 1.

[6] The reflector for lighting according to the above item [4] or [5], further comprising a reflective material 2 made of a polymer membrane of which an average reflectance of 400 to 700 nm wavelength of at least one surface side is 85% or more and having no ridge-shaped uneven shape.

[7] The reflector for lighting according to any of the above items [4] to [6], wherein the reflector contains a connection material for connecting a plurality of reflective materials.

[8] The reflector for lighting according to the above item [7], wherein the reflective material 1, the reinforcing material and the connection material are made of a polyester film.

[9] The reflector for lighting according to any of the above items [1] to [8], wherein the reflective material made of the polymer membrane of which the average reflectance of 400 to 700 nm wavelength of at least one surface side is 85% or more forms a side part continuing from the bottom part of the reflector, and has a groove formed on the back side of the one surface side on the boundary of the bottom part and the side part.

[10] A reflector for lighting, comprising a reflective material made of the polymer membrane of which the average reflectance of 400 to 700 nm wavelength of at least one surface side is 85% or more, forming a side part continuing from the bottom part of the reflector, and having a groove formed on the back side of the one surface side on the boundary of the bottom part and the side part (a reflector for lighting of the second aspect).

[11] A back light device for displaying information using the reflector for lighting according to any one of the above items [1] to [11].

We provide a reflector for lighting which has shape holding property, flexibility and lightweight property. That is, there can be provided the reflector for lighting which reproduces the optical design faithfully and has excellent handling property at the time of installation and conveyance such as positioning in a mounting work to a frame or the like.

DESCRIPTION OF THE SYMBOLS

Figure 1:
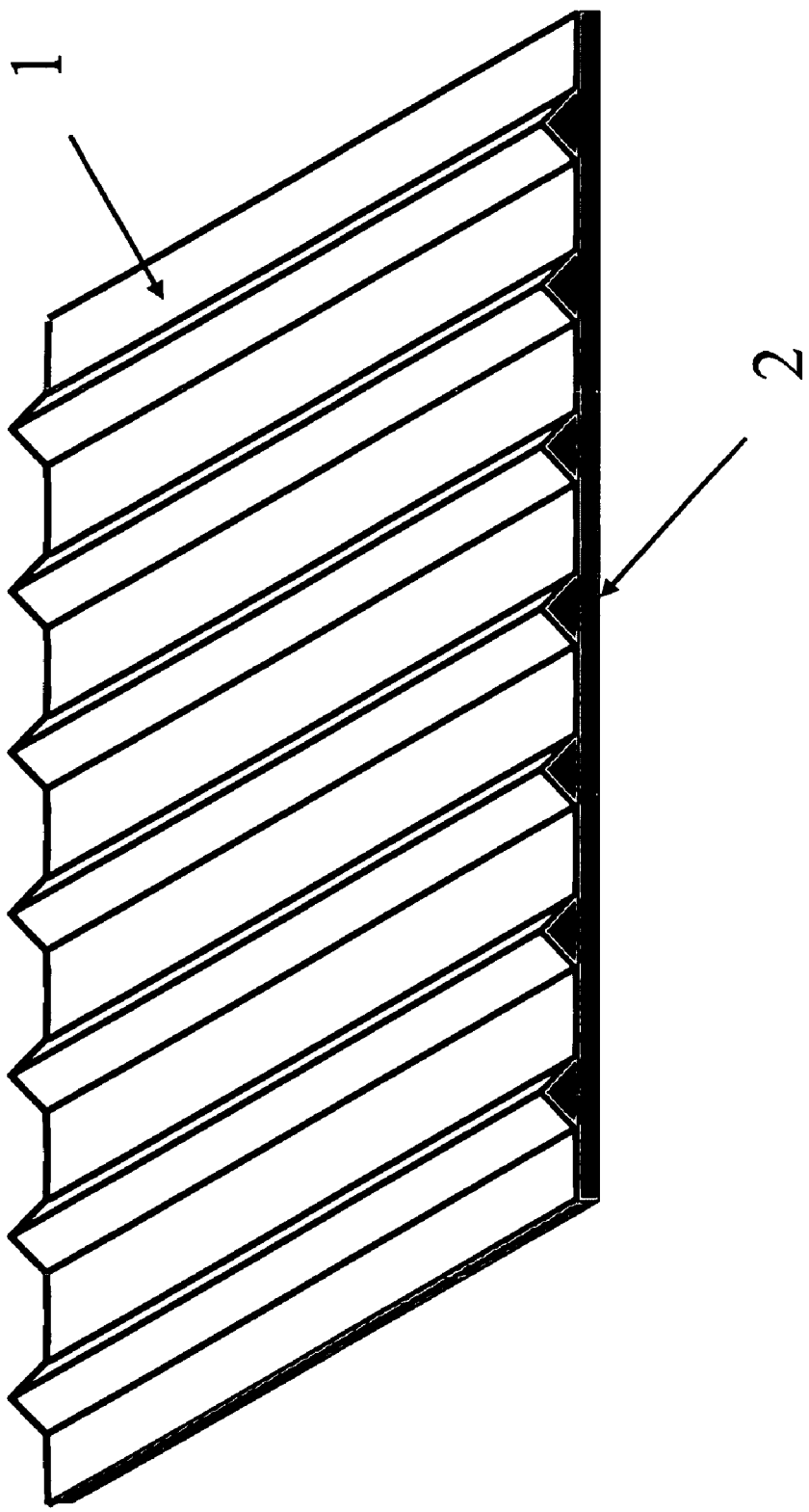
FIG. 1 is a conceptual view of a reflector for lighting.
Figure 2:
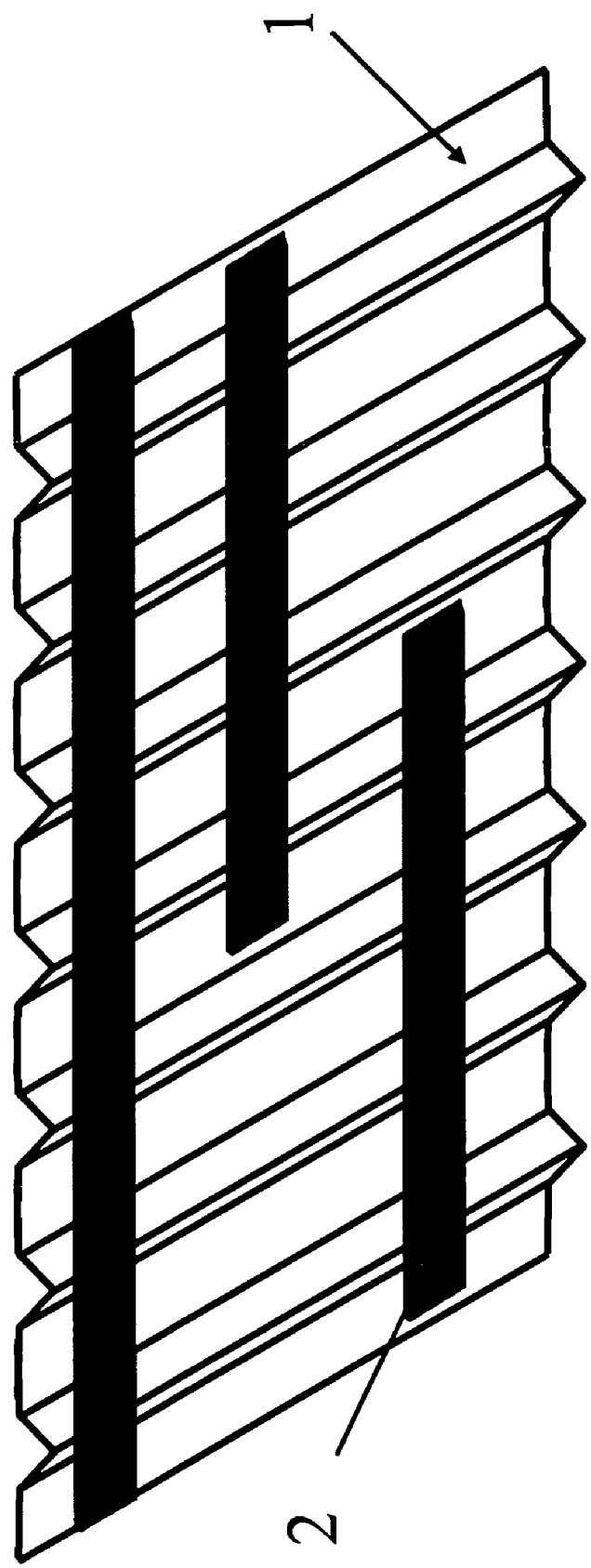
FIG. 2 is a back conceptual view of a reflector for lighting with a tape-like reinforcing material.
Figure 3:
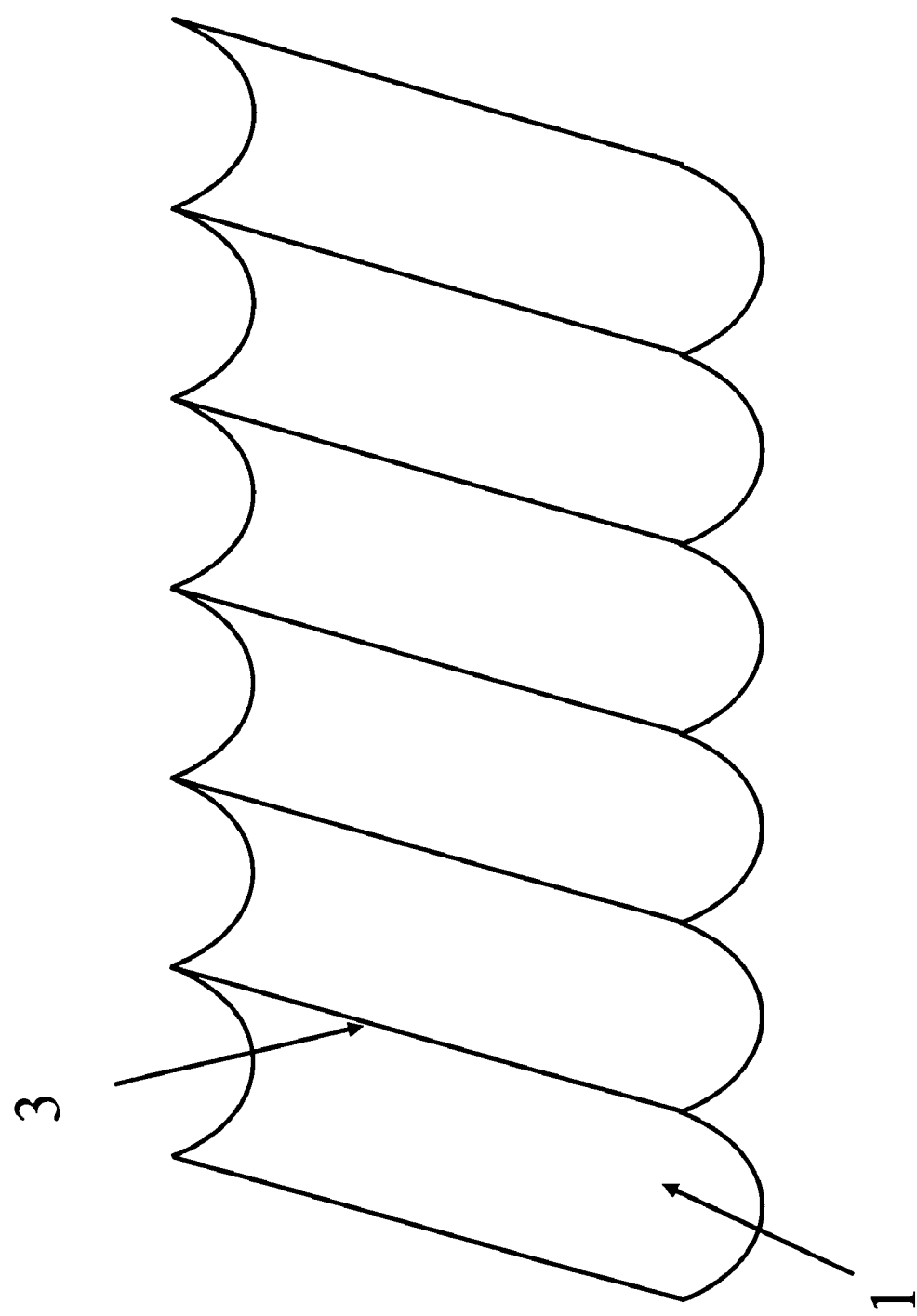
FIG. 3 is a conceptual view of a reflective material 1.
Figure 4:
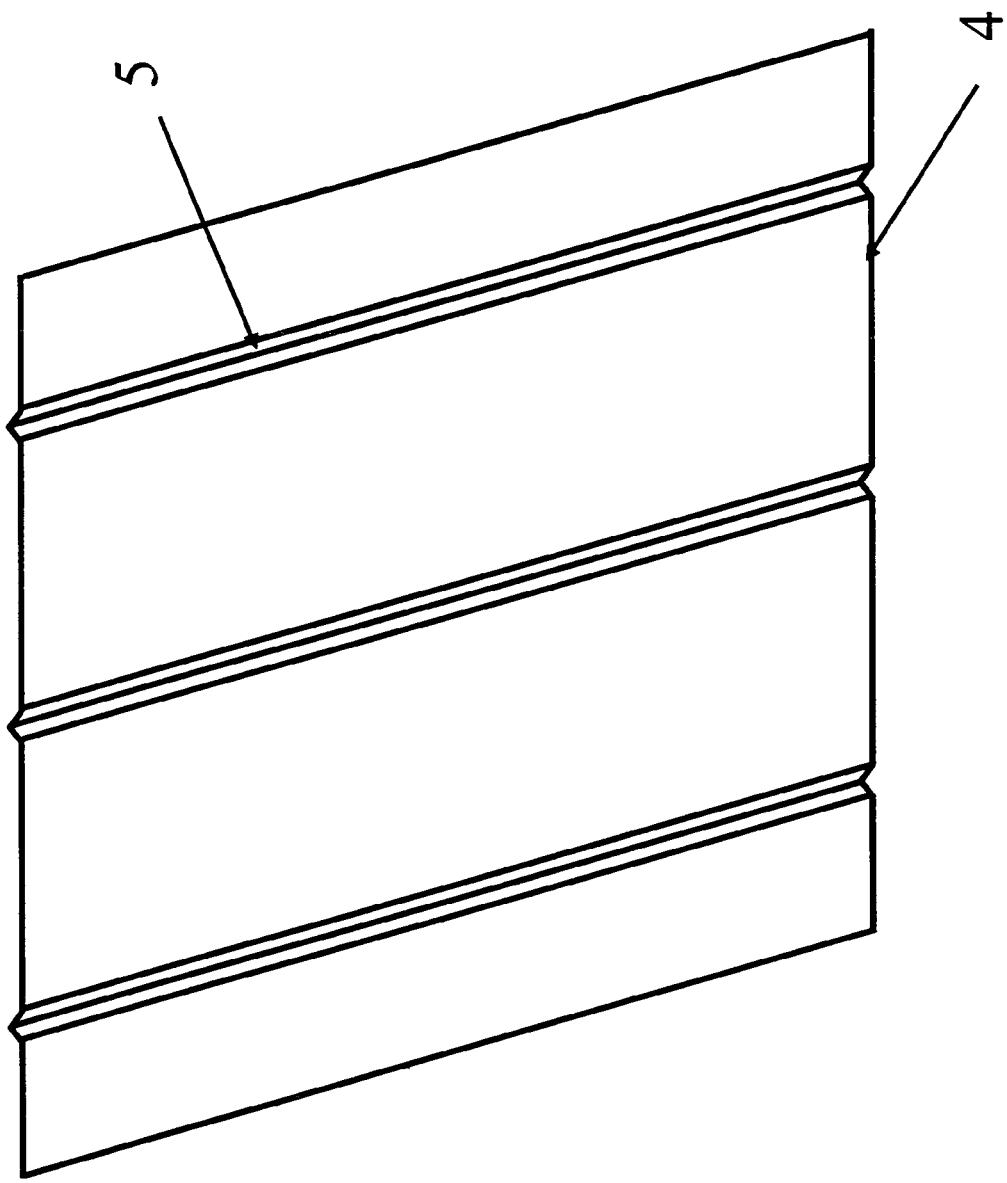
FIG. 4 is a conceptual view of a reflective material having ridge-shaped projections obtained by a bending processing.
Figure 5:
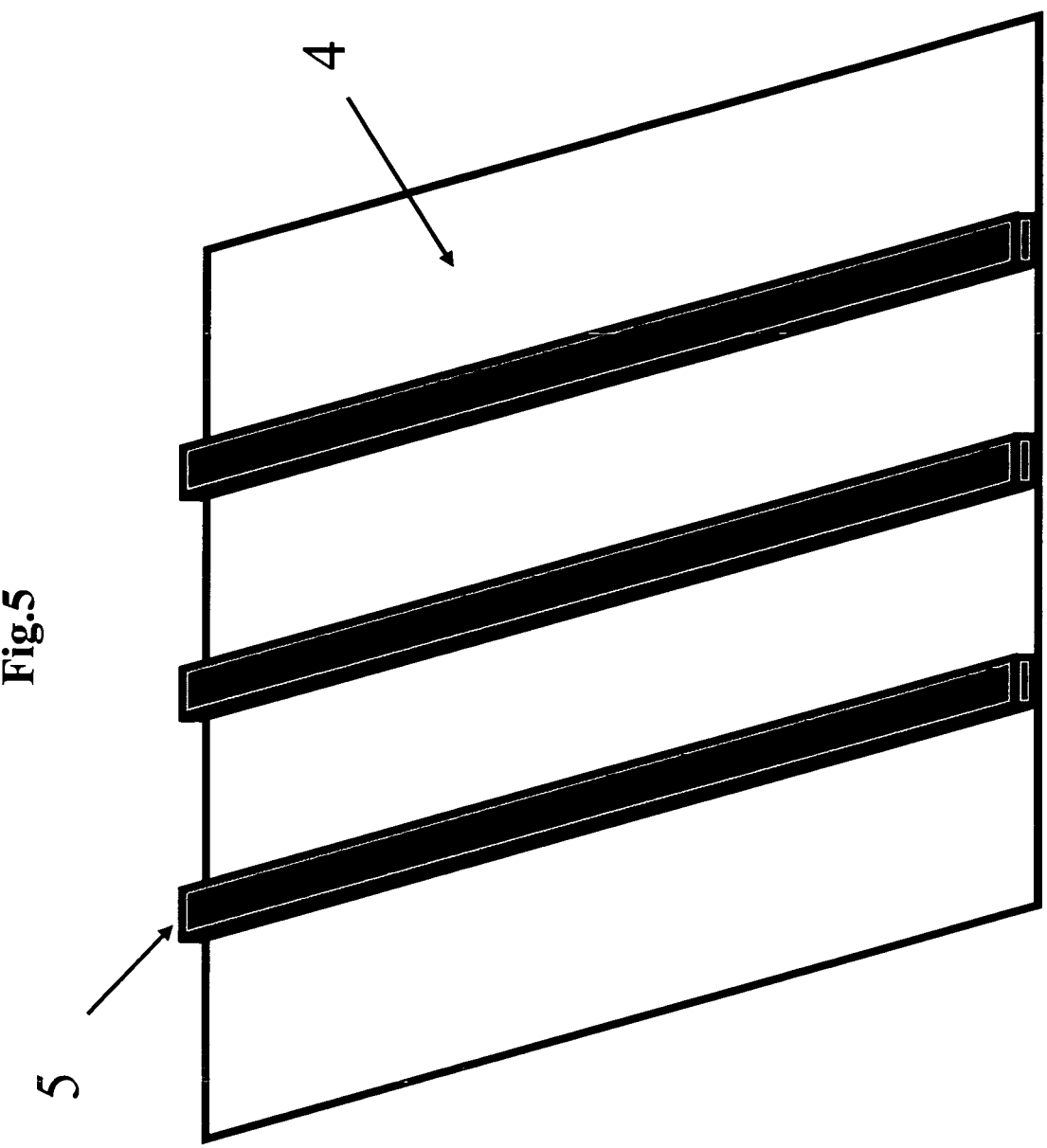
FIG. 5 is a conceptual view of a reflective material having ridge-shaped projections obtained by the bond of frame-like members.
Figure 6:
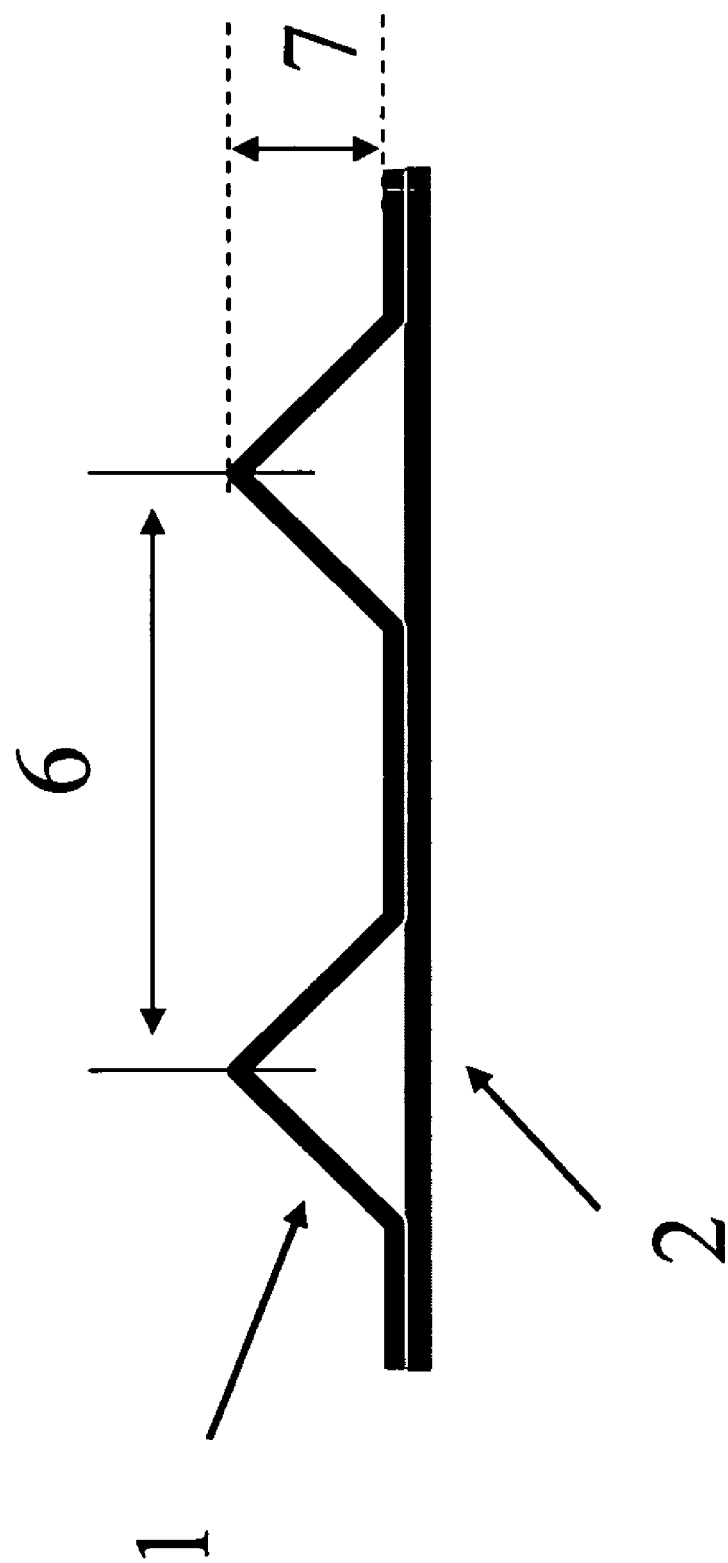
FIG. 6 is a conceptual sectional view of a reflector for lighting.

1: reflective material 1
2: reinforcing material
3: edge line part of convex part
4: reflective material
5: ridge-shaped projection
6: interval D between tops
7: height H
8: circle for calculating curvature radius R of top
9: groove
10: material compounded to reflective material
11: connection material
12: plane-like reflective material
13: U-shaped cold cathode tube
14: reflective material processed into a shape for blocking difference of surface shape
15: connection material having function of weather strip material
16: reflective material 2
17: reflective material 1
18: reinforcing material/connection material
19: reflector sample for lighting for evaluating front luminance
20: cold cathode tube
21: front luminance distribution curving line
22: wire model supposing a U-shaped cold cathode tube
23: hole of 6 mm φ
24: aluminum plate
25: metal pin
26: installation angle
27: black tape
28: material a processed into cylindrical shape of square of 100 mm×100 mm
29: peak position
30: effective data range
31: luminance data measuring range
32: bottom part
33: side part
34: boundary of bottom part and side part
35: bending angle A
36: edge part
37: bending angle AcMAX in a state of being most bent
38: bending angle AoMAX in a state of being most opened
39: bending angle difference ΔA (=AoMAX−AcMAX)

DETAILED DESCRIPTION

Our reflector for lighting has a reflective material made of a polymer membrane. The polymer membranes shown by the following items (1) to (4) and having apparent whiteness are a preferable aspect.

(1) A polymer membrane obtained by adding organic and inorganic dyes, and organic and inorganic particulates or the like to thermo-plastics;

(2) A polymer membrane obtained by mixing the constituting resin component with a resin and/or organic or inorganic particles being incompatible with the resin component, melting and extruding, and then drawing the extruded resin in the at least one direction to form minute voids in the resin;

(3) A polymer membrane foamed by adding fizzy particles, melting and extruding; and (4) A polymer membrane extruded and foamed by injecting gas such as carbon dioxide or the like.

Particularly, the aspect of the above item (2) is preferable as the polymer membrane having improved reflectance and luminance. As the laminated film, for example, one obtained by controlling the size of the voids in each layer according to the difference or the like of the particle diameter, kind and resin component composition of the particle of the above item (2), and setting the size of the voids in the surface layer finer than that of the inner layer is particularly preferable.

A thermoplastic resin constituting the polymer membrane need only to be one which can form a film by melting and extruding, and examples of the thermoplastic resins include polyester, polyolefin, polyamide, polyurethane and polyphenylene sulphide. Particularly, in view of good dimensional stability and mechanical property, and almost no absorption in a visible light region, polyester is preferable.

Examples of polyester include polyethylene terephthalate (PET), polyethylene-2,6-naphthalene dicarboxylate (PEN), polypropylene terephthalate, polybutylene terephthalate, and poly-1,4-cyclohexylene dimethylene terephthalate. Though the polyesters are preferably used as a homopolymer, the polyesters may be used as a copolymer. Examples of copolymerization components in the case of using as the copolymer include an aromatic dicarboxylic acid, a fatty dicarboxylic acid, an alicyclic dicarboxylic acid, a diol component having carbon numbers of 2 to 15. More specific examples include an isophthalic acid, an adipic acid, a sebacic acid, a phthalic acid, a sulfonic acid base-containing isophthalic acid, ester formation property compounds thereof, and diethylene glycol, triethylene glycol, neopentyl glycol and polyalkylene glycol having a number average molecular weight of 400 to 20,000.

Various kinds of additive agents, for example, a heat-resistant stabilizer, an antioxidant stabilizer, a lubricant, organic and inorganic particulates, a light-resistant agent, an antistatic agent, a nucleating agent and a coupling agent or the like may be added into the reflective material by kneading and application or the like within the range where the effect is not inhibited. For example, so as to exhibit the optical characteristic stably over a long period of time, it is preferable to contain the light-resistant agent, and it is more preferable to have a protective layer containing the light-resistant agent at the upper surface side. There can be used an organic light stabilizer such as hindered amine system, salicylic acid system, benzophenone system, benzotriazole system, cyanoacrylate system, triazine system, benzoate system and an oxalic acid anilide system as the light-resistant agent, and a copolymerization polymer including the light stabilization structures thereof, or an inorganic light stabilizer such as sol gel. Examples of the light-resistant agents suitably used are shown below. These may be used singly or in combination of two kinds or more.

Hindered amine system:
bis(2,2,6,6-tetramethyl-4-piperidyl)sebacate, dimethyl succinate-1-(2-hydroxyethyl)-4-hydroxy-2,2,6,6-tetramethylpiperidine polycondensate.

Salicylic acid system: p-t-buthylphenylsalicilate, p-oethylphenylsalicilate.

Benzophenone system:
2,4-dihydroxybenzophenone, 2-hydroxy-4-methoxybenzophenone, 2-hydroxy-4-methoxy-5-sulfobenzophenone, 2,2'-4,4'-tetrahydroxybenzophenone, 2,2'-dihydroxy-4-methoxybenzophenone, 2,2'-dihydroxy-4,4'-dimethoxybenzophenone, bis(2-methoxy-4-hydroxy-5-benzoylphenyl)methane.

Benzotriazole system:
2-(2'-hydroxy-5'-methylphenyl)benzotriazole, 2-(2'-hydroxy-5'-tert-butylphenyl)benzotriazole, 2-(2'-hydroxy-3',5'-di-tert-buthylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-5'-t-octylphenol)benzotriazole, 2-(2'-hydroxy-3',5'-di-tert-amylphenyl)benzotriazole, 2,2'-methylenebis[4-(1,1,3,3-tetramethylbutyl)-6-(2H-benzotriazole-2-yl) phenol], 2(2'hydroxy-5'-metacryloxyphenyl)-2H-benzotriazole, 2-[2'-hydroxy-3'-(3",4",5",6"-tetrahydrophthalimidemethyl)-5'-methylphenyl] benzotriazole, 2-(2'-hydroxy-5-acryloyloxyethylphenyl)-2H-benzotriazole, 2-(2'-hydroxy-5'-metacryloxyethylphenyl)-2H-benzotriazole, 2-(2'-hydroxy-3'-tert-buthyl-5'-acryloylethylphenyl)-5-chloro-2H-benzotriazole.

Cyanoacrylate system: ethyl-2-cyano-3,3'-diphenylacrylate.

Other than those above:
nickel bis(octylphenyl)sulfide, [2,2'-thiobis(4-t-octylphenolate)]-n-buthyl amine nickel, nickel complex-3,5-di-t-buthyl-4-hydroxybenzyl phosphoric acid monoethylate, nickel-dibuthyldithiocarbamate, 2,4-di-t-buthylphenyl-3',5'-di-t-buthyl-4'-hydroxybenzoate, 2,4-di-t-butylphenyl-3',5'-di-t-butyl-4'-hydroxybenzoate, 2-ethoxy-2'-ethyloxacacidbisanilide, 2-(4,6-diphenyl-1,3,5-triazine-2-yl)-5-[(hexyl)oxy]-phenol.

In the reflector for lighting, the reflective characteristic of the reflective material is defined by the 85% or more average reflectance of 400 to 700 nm wavelength of at least one surface side. The average reflectance of 400 to 700 nm wavelength is obtained by measuring the spectroreflectance of the wavelength range of 400 to 700 nm at an interval of 10 nm according to JIS Z 8722 to calculate the arithmetic average value of each measured value. So as to enhance reflective efficiency, the average reflectance is preferably 87% or more, more preferably 90% or more, and still more preferably 95% or more.

A biaxial drawing polyester film in which the heat shrinkage ratio is 1.8% or less on an exposure condition at 150° C. for 30 minutes is preferably used as the reflective material so that a three-dimensional structure applied so that the reflector for lighting exhibits an optical characteristic is not simply changed during a manufacture process and use. The heat shrinkage ratio is more preferably 1.5% or less, and still more preferably 1.0% or less.

A material compounded according to the use can be used for the reflective material used for the reflector for lighting. For example, so as to enhance the reflective efficiency, the use of two bonded materials having a different reflective characteristic is one of preferable aspects. In a use in which the leak of light to the reverse side of the reflector for lighting is not wanted, it is one of preferable aspects to bond a coloring film such as a black film and a metal foil. The specific examples of composite suitably used are shown below.

Combined partner raw material:
   polyester film, polyolefin film, polyamide film, polyurethane film, polyphenylene sulphide film, aluminum foil, iron foil, copper foil Combined method: cohesion, adhesion, heat fusion.

It is also one preferable aspect to form a shading layer, a heat transmission layer, a conductive layer and an insulating layer on the back side of the material constituting the reflective material by printing or vapor deposition. A combined part is not limited to the whole area of the constituting material, and a separate combined form may be used for only a part or every part.

In the reflector for lighting, plane shape, uneven shape such as ridge shape, wave pattern, sawtooth, rough skin, parallel crosses, checkered pattern and dimple, and the combination thereof or the like can be suitably designed and used according to demands such as optical characteristic, installation property and handling enhancement as the surface shape of the reflective material. It is also a preferable aspect to form the shape on the back side of the reflector for lighting so as to attain demands for easy installation property and enhancement in handling property or the like while reducing the optical influence and physical restriction of the surface of the reflector for lighting. Since the optical influence on the surface of the reflector is small particularly when the shape is formed by bonding the members, the range where the material, size and shape of the raw materials to be bonded can be selected is preferably spread. It is a preferable aspect to form the shape on the raw material constituting the back side of the reflector for lighting in the reflective material using the composite material from the same reason.

The reflective material may have a finer ridge-shaped projection which is not reinforced by a reinforcing material to be described later in addition to the ridge-shaped uneven shape of the reflective material 1 described below. The ridge-shaped projection is a preferable aspect since it is difficult to bend when a thin reflector having light weight is treated. The shape, arrangement and combination of the ridge-shaped projection can be selected according to structures required on the handling property and design of the reflector for lighting. For example, so as to reduce the optical influence and physical restriction due to the ridge-shaped projection, the arrangement constitution of the ridge-shaped projection under a light source is a preferable aspect. Referring to the size of the ridge-shaped projection, the width and the height are preferably 0.5 to 10 mm, more preferably 0.5 to 5 mm, and still more preferably 1 to 3 mm. A means for forming the ridge-shaped projection can be selected from a bending processing, a heat press and a bonding of bar members or the like according to the demand characteristic and the manufacture process of the reflector for lighting.

The reflector for lighting of a first aspect has a reflective material 1 made of the polymer membrane whose the reflectance of at least one surface side is 85% or more and having the ridge-shaped uneven shape. The mixture of the lights of line light sources such as a fluorescent light and a cold cathode tube can be prevented by provision of the reflective material 1 having the ridge-shaped uneven shape, and a clear display can be enabled by efficiently using the line light source as a face light source.

The ridge-shaped uneven shape of the reflective material 1 can be suitably selected according to the use such as the shape of the line light source. So as to use as the reflector for lighting for using the line light source such as the fluorescent light and the cold cathode tube as the face light source, the interval D between the tops of the adjoining apex parts is preferably 0.5 to 500 mm, and the height H between the bottom part and the top of the apex part is preferably 0.5 to 500 mm. Particularly when using the cold cathode tube having a diameter of 2 to 6 mm, the interval D is more preferably 10 to 50 mm, and the height H is more preferably 3 to 15 mm. So as to form the convex part in an acute angle in the case or the like of corresponding to the light source arranged with high density, the curvature radius R of the top of the edge line part is preferably 1 mm or less in a section shape perpendicular to a straight line as the edge line part of the convex part of the reflective material 1, more preferably 0.8 mm or less, and still more preferably 0.7 mm or less.

It is preferable that the reflective material 1 has a groove formed on the back side of the edge line part of at least the convex part. The shape of the convex part satisfying the optical design can be faithfully reproduced by the provision of the groove while reducing the stress due to the bending to prevent remarkable degradation of surface shape such as wrinkles and fracture and quality of the material.

Figure 8:
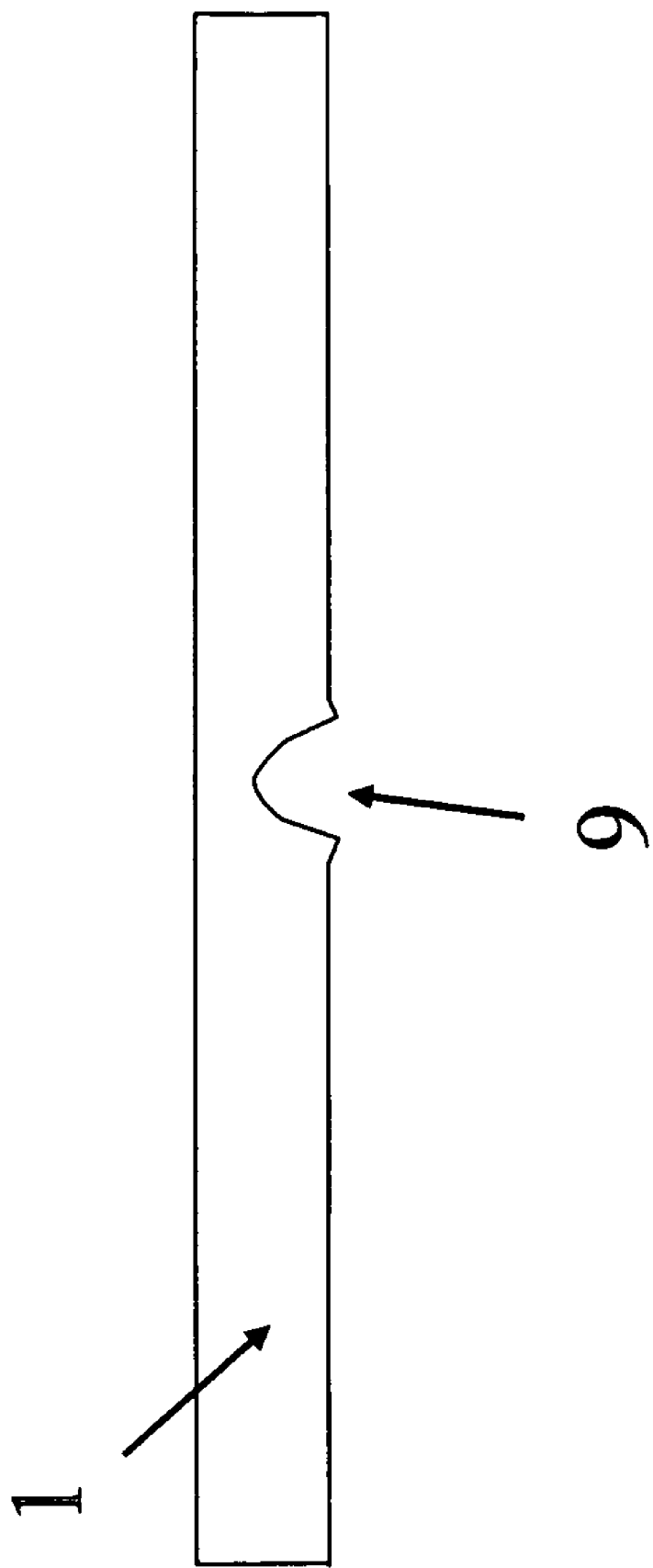
FIG. 8 is an example 1 of a conceptual sectional view of a groove part when developing a bent part of a reflective material.
Figure 9:
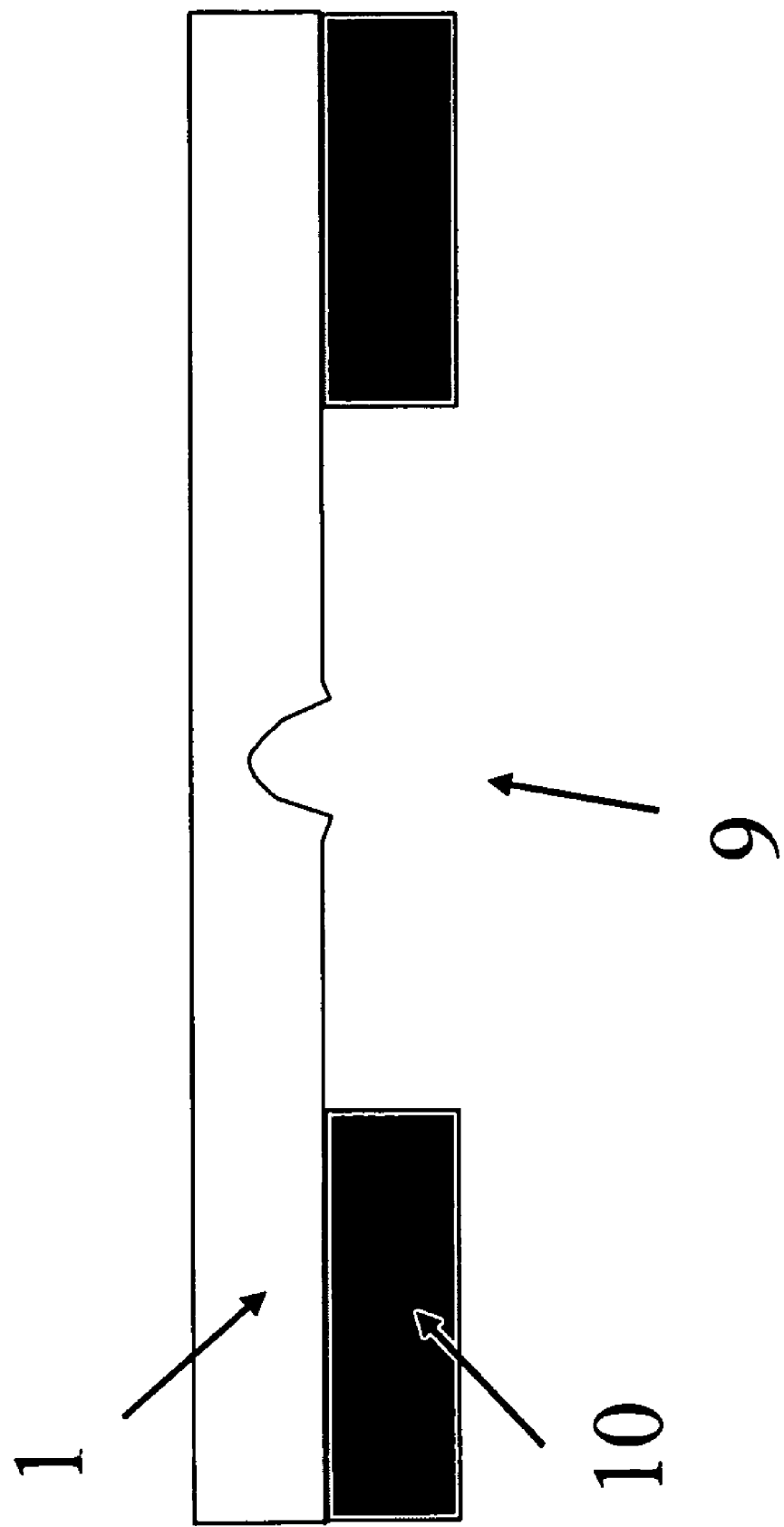
FIG. 9 is an example 2 of a conceptual sectional view of a groove part when developing a bent part of a reflective material.
Figure 10:
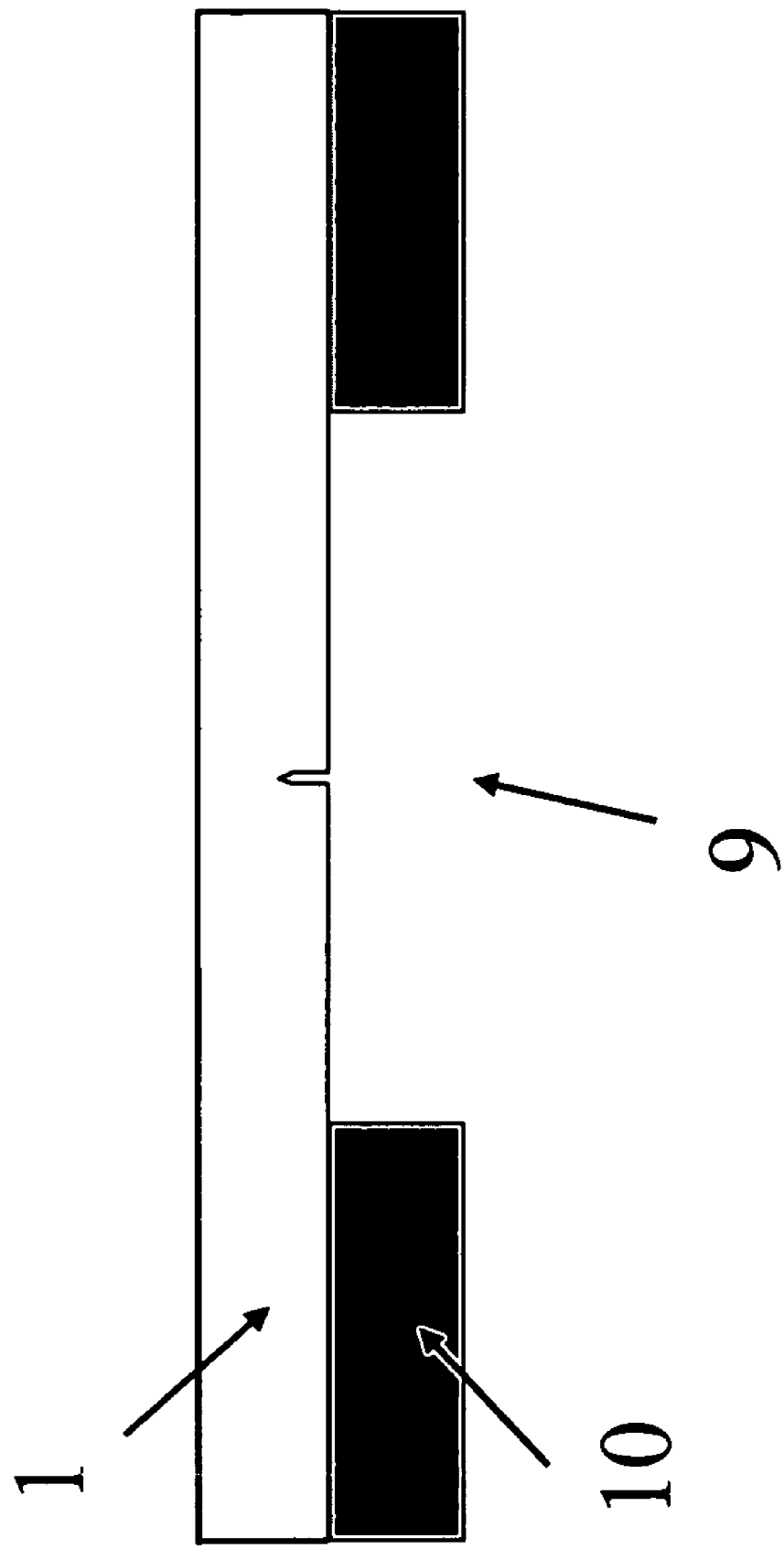
FIG. 10 is an example 3 of a conceptual sectional view of a groove part when developing a bent part of a reflective material.
Figure 11:
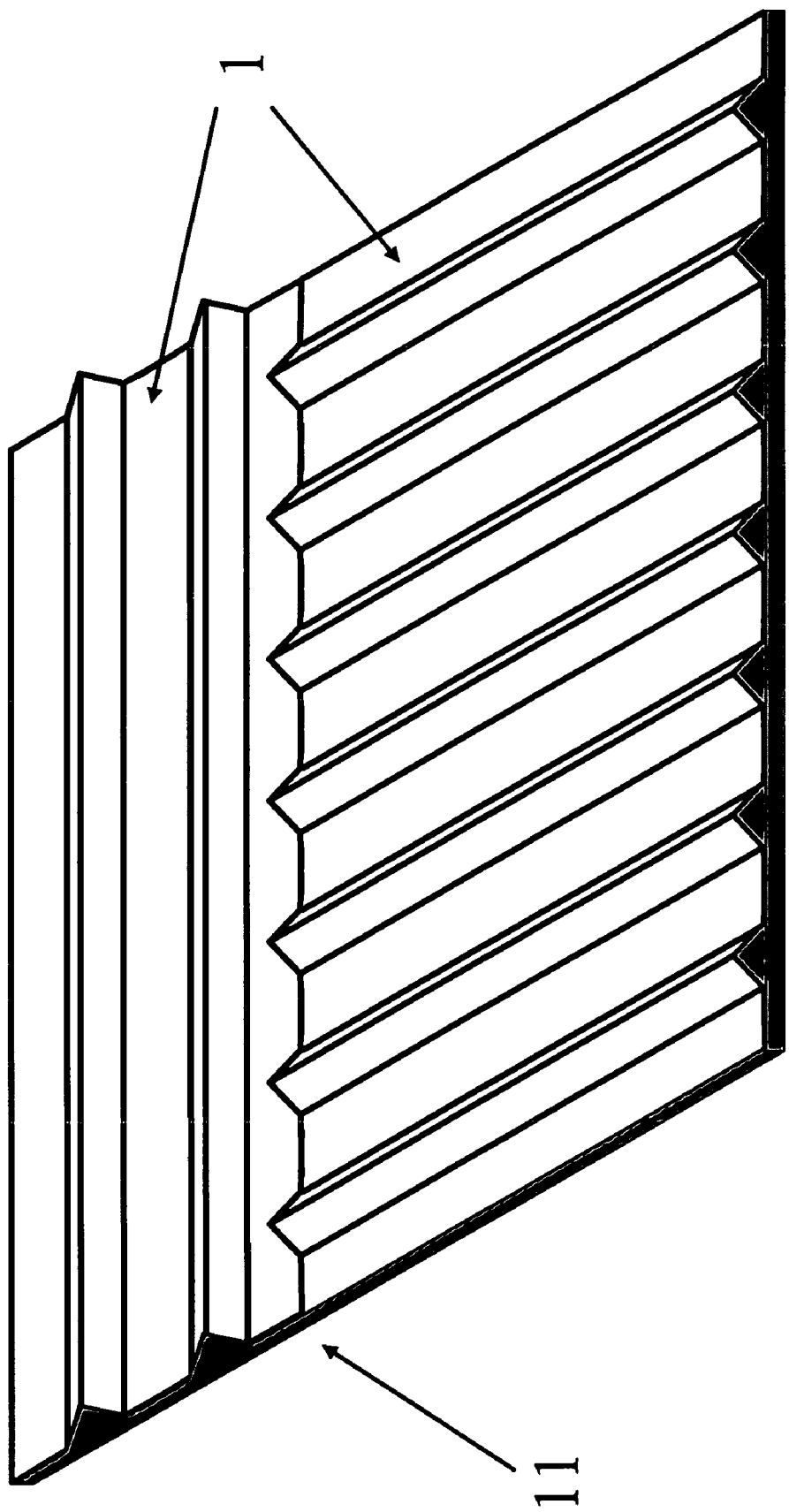
FIG. 11 is a conceptual view of a reflector for lighting containing a plurality of reflective materials 1.
Figure 12:
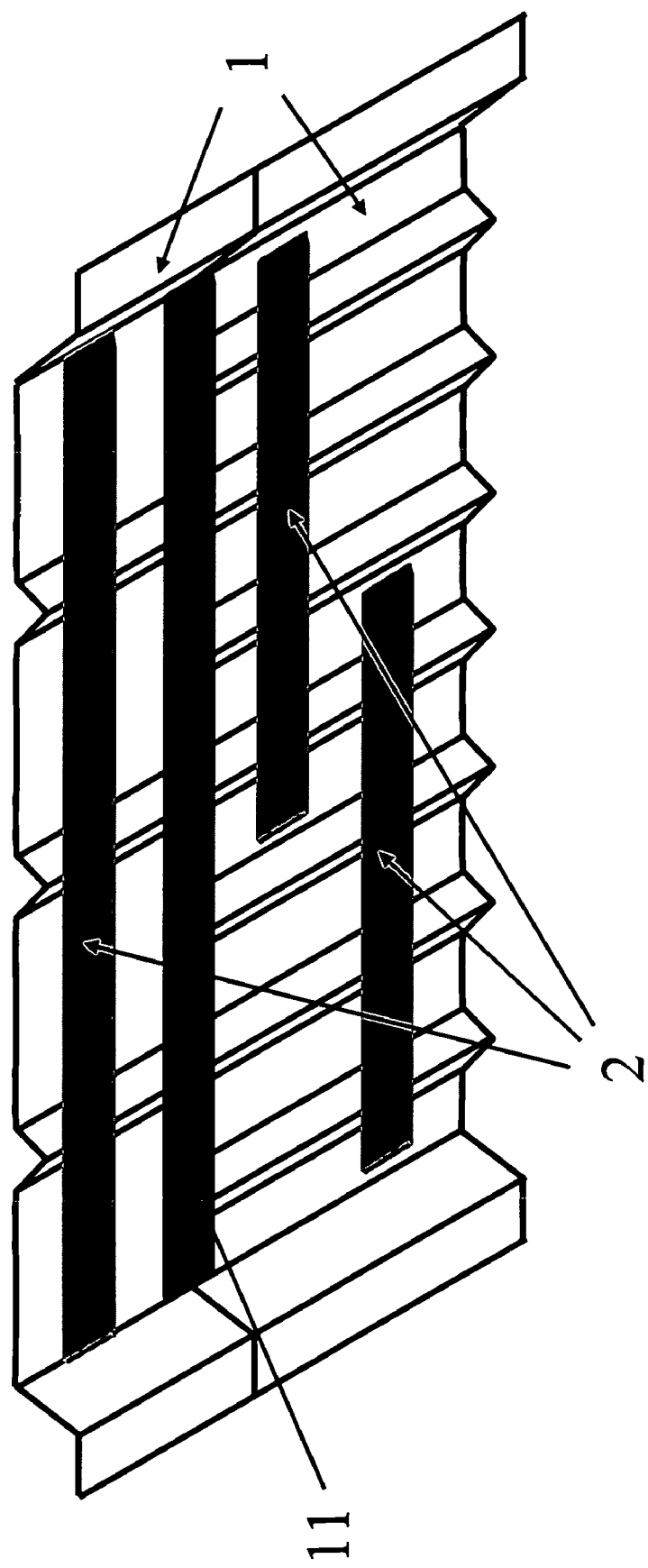
FIG. 12 is a back conceptual view of a reflector for lighting integrated by a tape-like connection material.

For example, the groove can be suitably selected according the quality of the material and thickness of the reflective material 1 from specific examples shown below.
   groove shape: V-shaped type, U-shaped type, channel-shaped type, straight-line type
   groove constitution: crushing, boring, partial cut For example, when the raw material has a thickness of the reflective material not being so thick and has voids, it is a preferable aspect to form the V-shaped or U-shaped groove by crushing since the raw material strength is not remarkably reduced. On the other hand, in the reflective material having enhanced reflectance by interface reflection due to the internal voids, it is a preferable aspect to partially cut a part of surface of the reflective material to form the groove so as to prevent the reduction of the reflectance by crushing the internal voids. FIGS. 8, 9 and 10 show an example of the section of a groove 9 when developing a part at which a reflective material is bent.

However, referring to the reflective material 1, it is preferable that no penetrated part is substantially formed in the edge line part of a convex part. The penetrated part herein means a part in which the raw material is penetrated from the surface side of the reflective material to the back side like the cut part of the perforated line. No provision of the penetrated part can prevent light from leaking therefrom.

In the reflector for lighting, it is a preferable aspect to contain a plurality of reflective materials for realizing industrially the shape of a reflector faithful to an optical design.

For example, it is a preferable aspect to contain a plurality of reflective materials 1 for realizing a complicated light distribution pattern.

Figure 13:
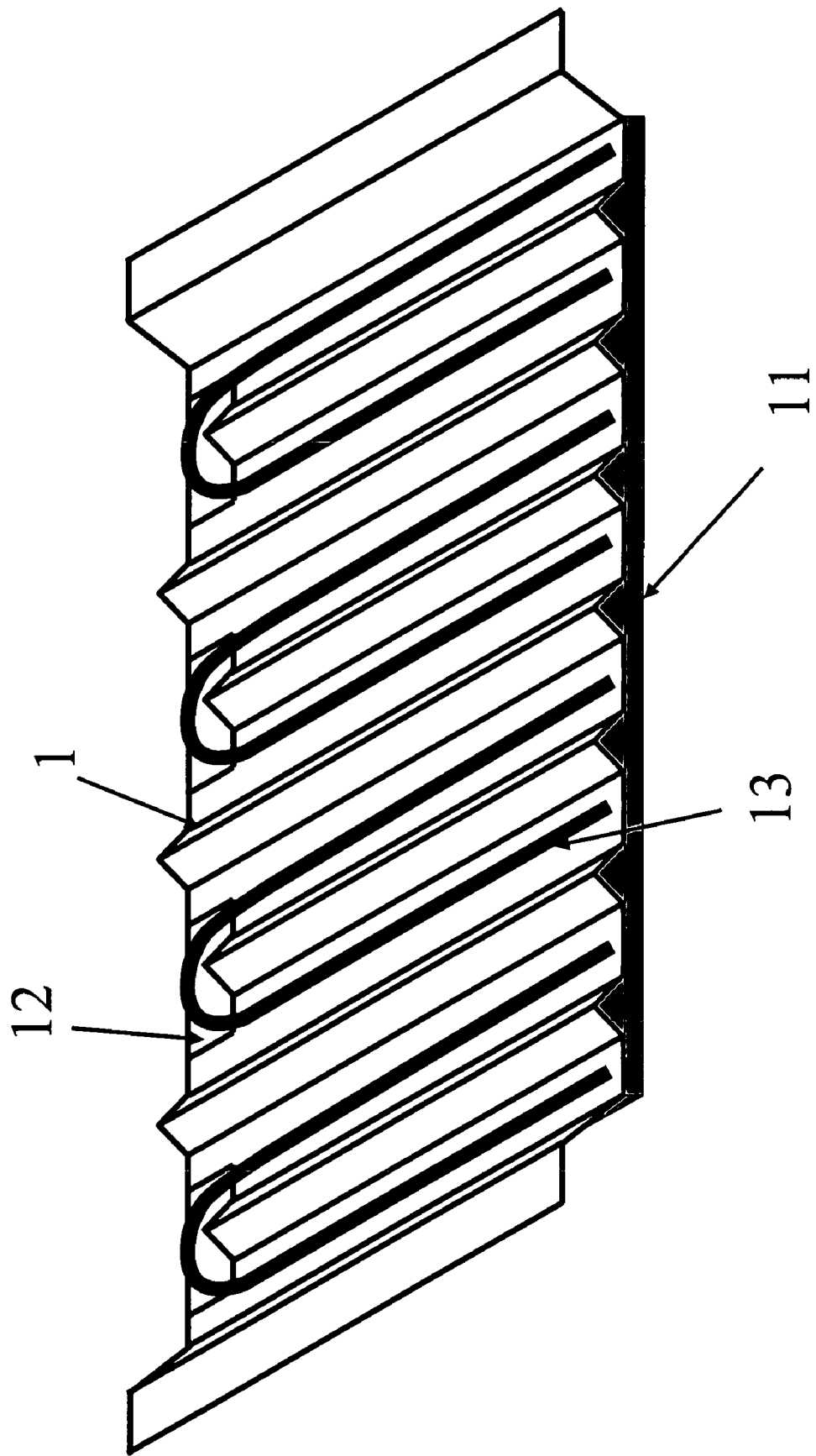
FIG. 13 is a conceptual view of an example of a reflector for lighting composed by a reflective material 1 and a plane-like reflective material.

In addition to the reflective material 1, it is preferable aspect to further contain the reflective material 2 and having no ridge-shaped uneven shape for realizing the reflector for lighting having the shape of the light source and the complicated surface shape corresponding to the arrangement. For example, when using the reflector for lighting using a plurality of U-shaped cold cathode tubes, as an example shown in FIG. 13, it is one of preferable aspects that the reflective material 1 having ridge-shaped unevenness is arranged so as to sandwich the straight line part of the cold cathode tube, and a plane-like reflective material is arranged at a part at which the cold cathode tube is bent for simultaneously pursuing optical design and physical limited condition. When it is necessary to install a member for supporting the light source on the reflector for lighting in a back light device or the like for large-sized liquid crystal TV, it is one of the preferable aspects that a part in which a member supporting the light source is installed enlarges the area of a plane-like reflector and a part in which the supporting member does not need to be installed enlarges the area used as three-dimensional structure for simultaneously pursuing optical design and physical limited condition.

Figure 14:
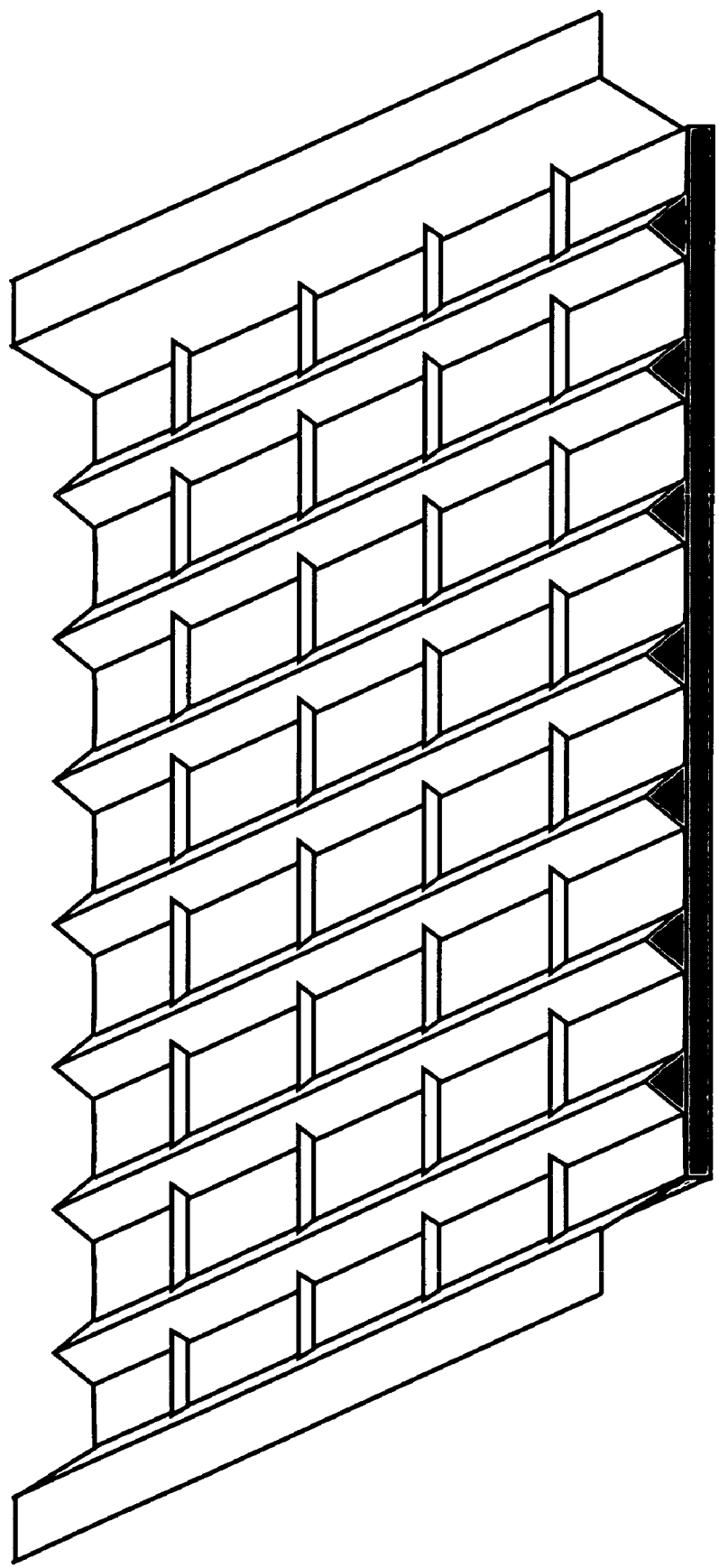
FIG. 14 is a conceptual view of an example of a reflector for lighting having a parallel crosses-like shape.
Figure 15:
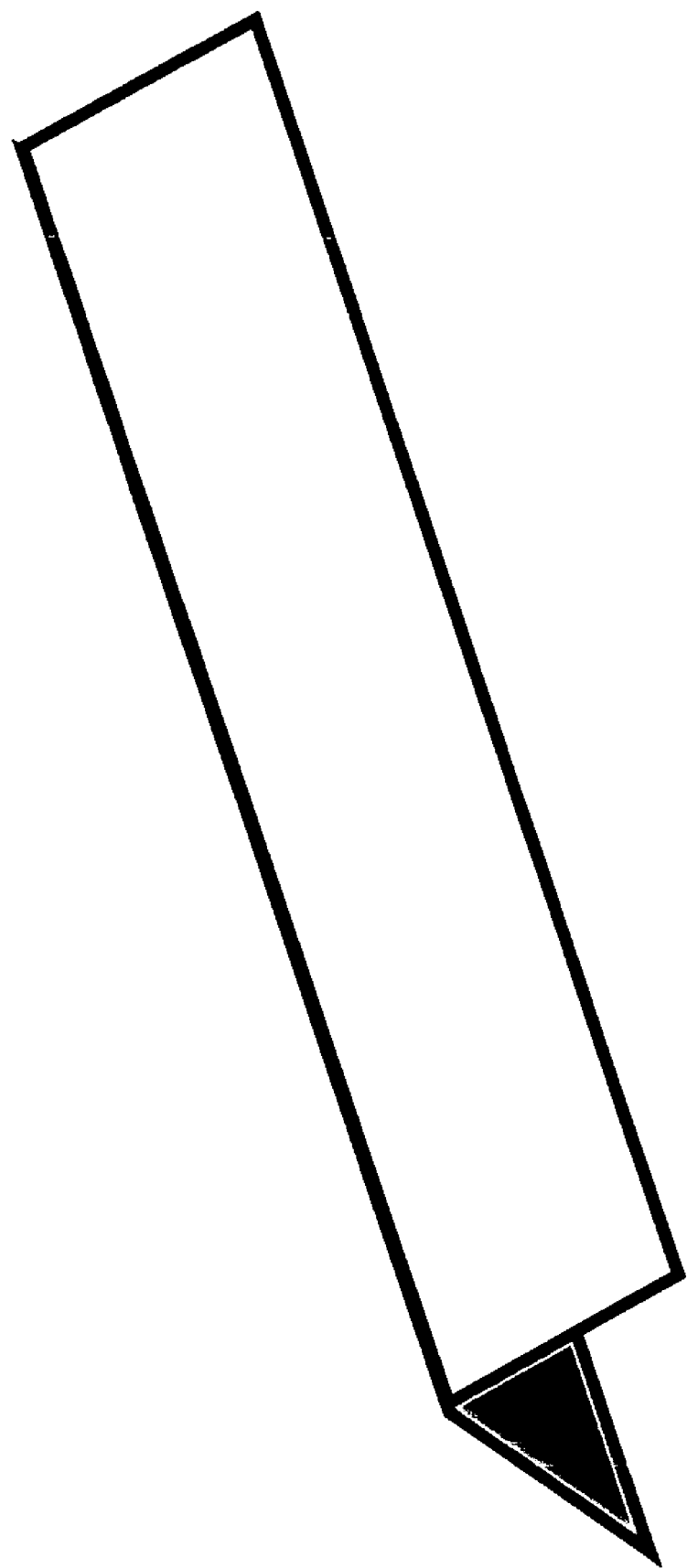
FIG. 15 is a conceptual view of an example of a reflective material 2.
Figure 16:
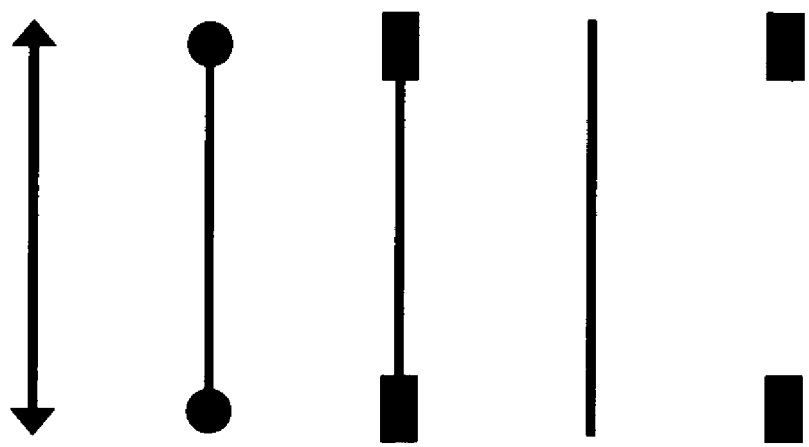
FIG. 16 is a conceptual view of examples of notches formed in a reflective material 1 so as to form a parallel crosses-like shape.

One of preferable aspects for combining the reflective material 1 and the reflective material 2 is a parallel crosses-like shape of which an example is shown in FIG. 14. It is possible to adjust the diffusion range and separation range of light by using the aspect having unevenness of the shape. When the color component and illumination of light in parts of the reflector are perceived and controlled by a sensor, it is possible to provide the shape of a reflector for lighting according to the balance of controllability and demand characteristic as lighting. For example, the parallel crosses-like unevenness can be formed by forming a notch in the direction perpendicularly intersecting with the longitudinal direction of the ridge of the reflective material 1 and by inserting a reflective material 2 having a shape shown in FIG. 15 in the notch part. The notch shape and the shape of the reflective material inserted into the notch can be selected according to a desired optical design.

The reflective material 2 may have the ridge-shaped projection which is not reinforced by the reinforcing material finer than the ridge-shaped uneven shape of the above reflective material 1.

Figure 17:
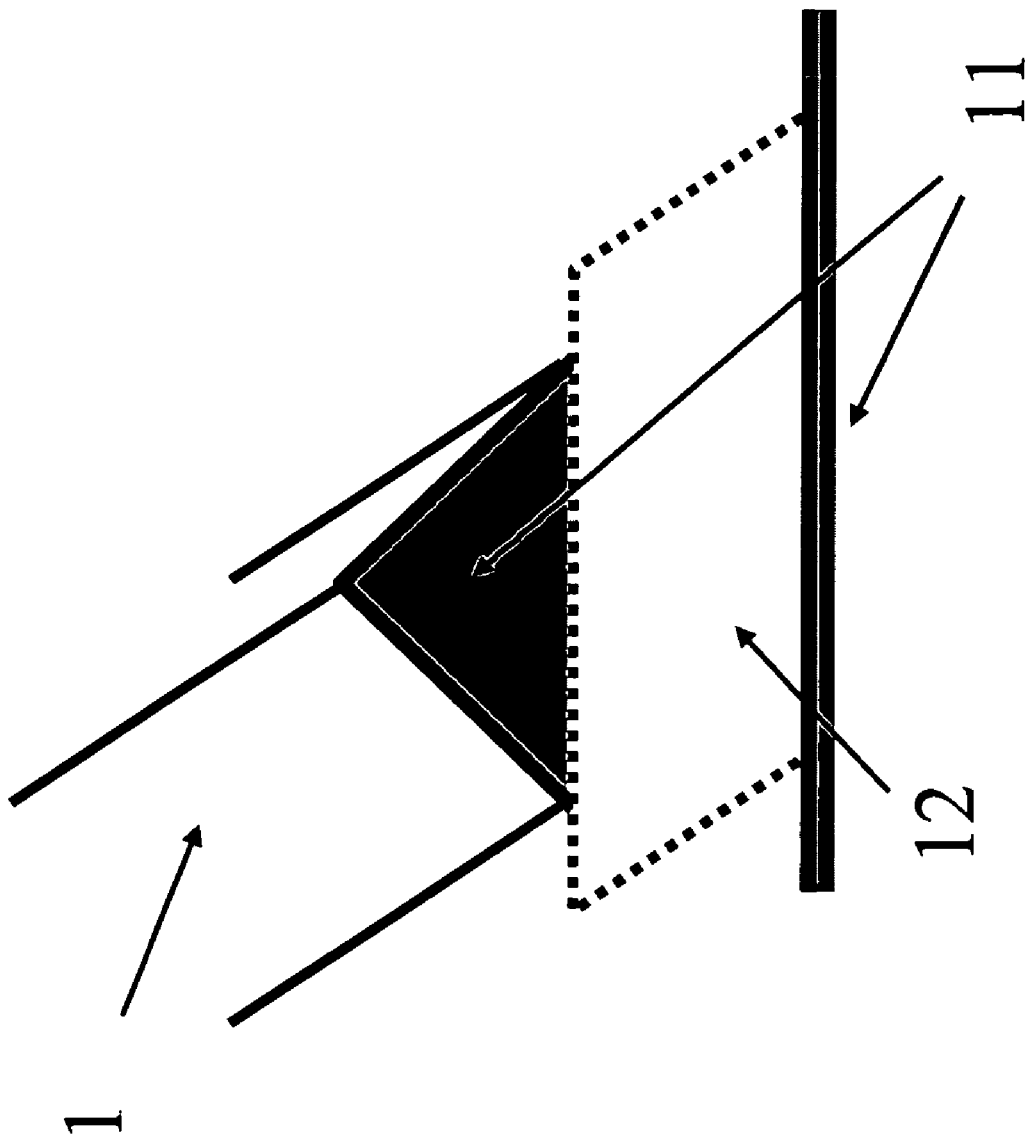
FIG. 17 is a conceptual view of an example in which the difference part of a surface shape is not particularly processed.
Figure 18:
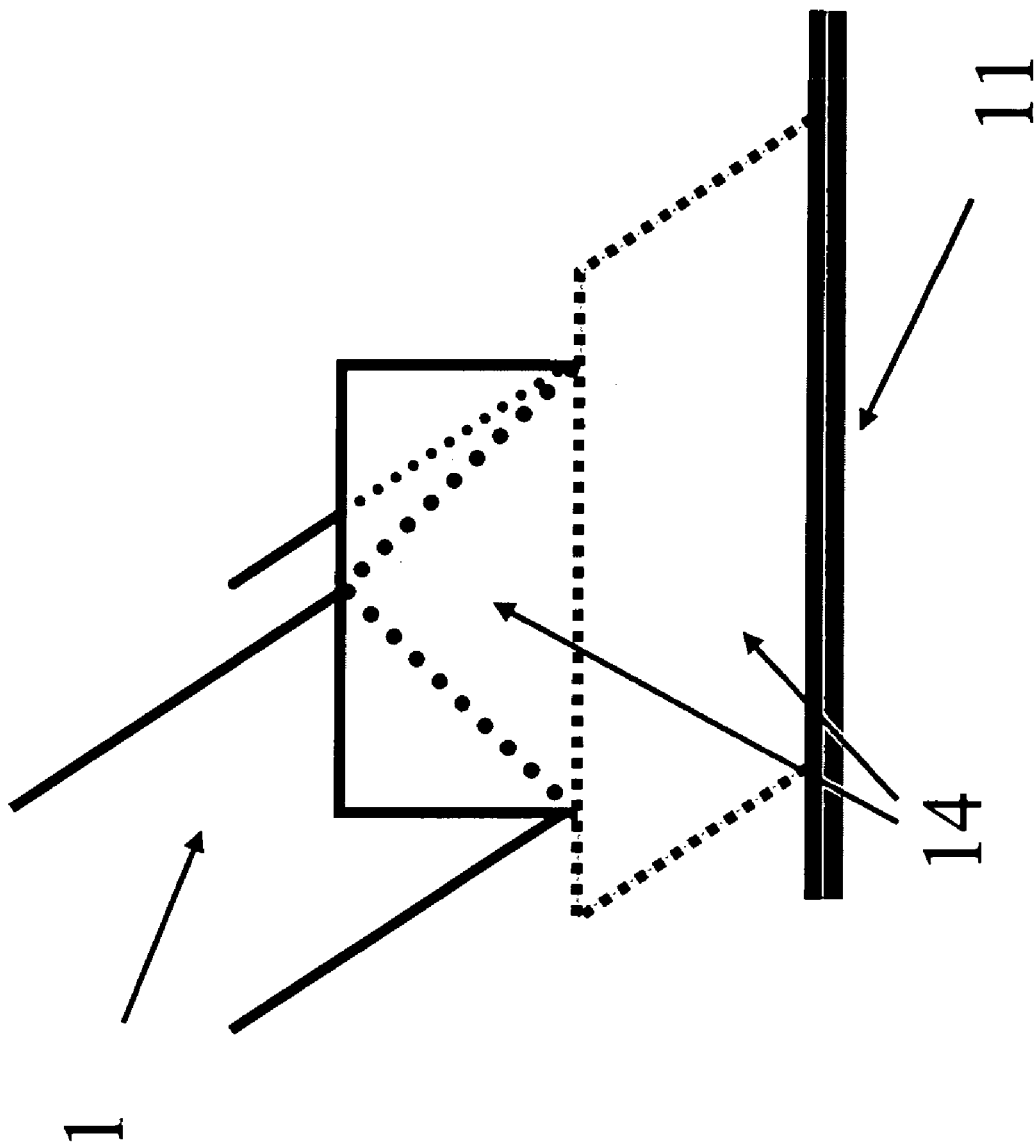
FIG. 18 is a conceptual view 1 of an example in which the difference part of a surface shape is blocked.
Figure 19:
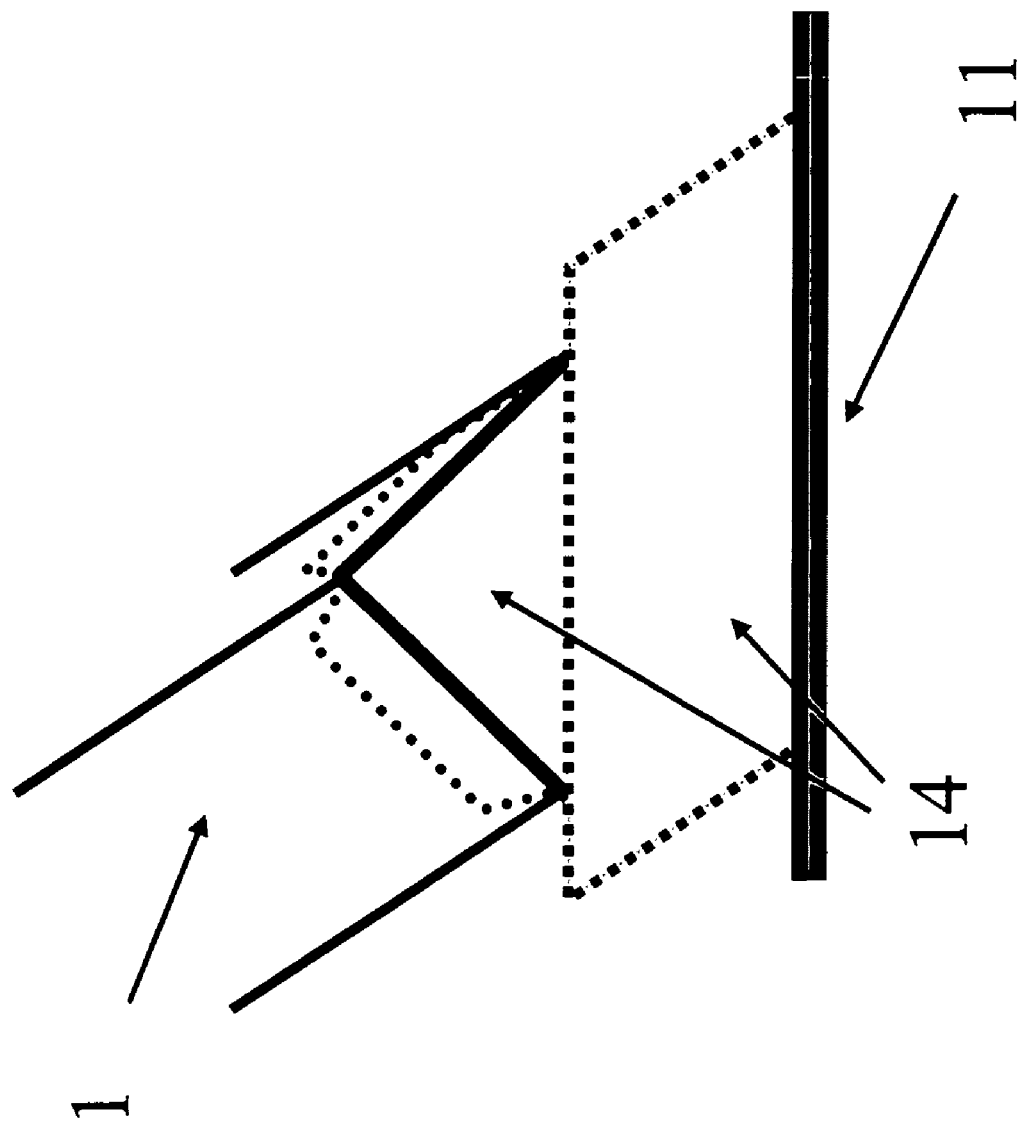
FIG. 19 is a conceptual view 2 of an example in which the difference part of a surface shape is blocked.
Figure 20:
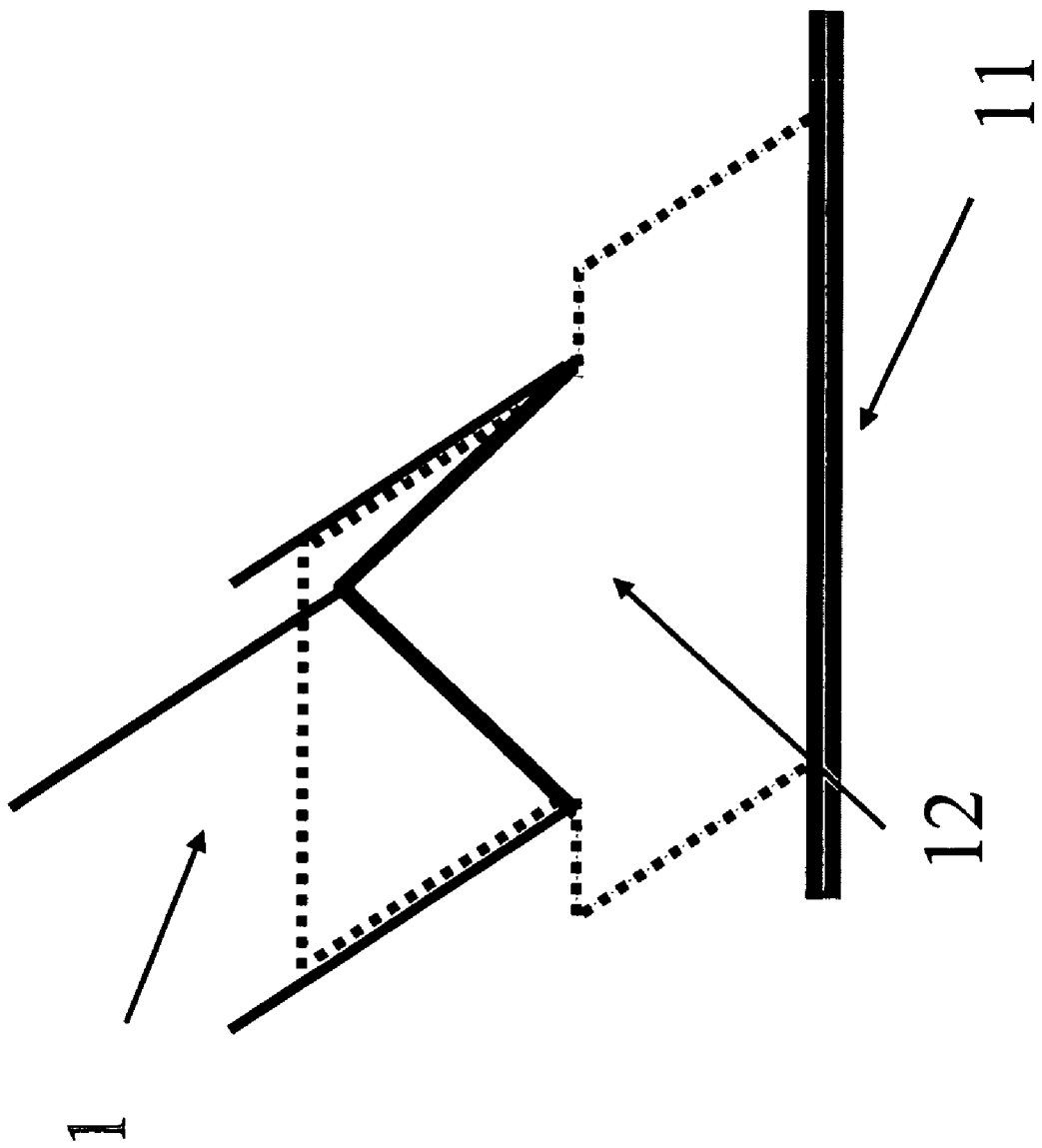
FIG. 20 is a conceptual view 1 of an example in which raw materials of the difference part of a surface shape are superimposed.
Figure 21:
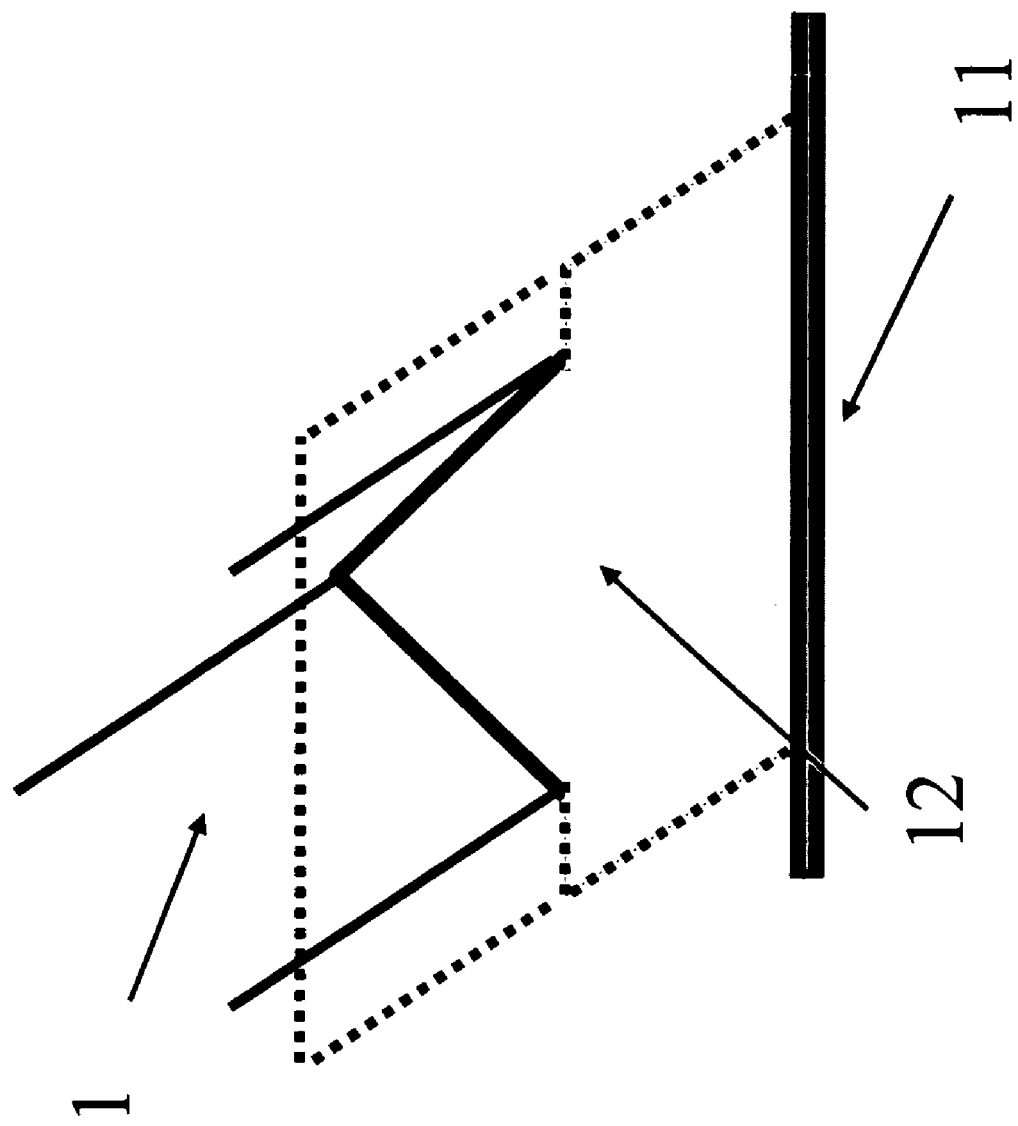
FIG. 21 is a conceptual view 2 of an example in which raw materials of the difference part of a surface shape are superimposed.

In the reflector for lighting, the shape of the boundary of the reflective materials can be designed according to the demanded characteristic. For example, when the surface shapes of the combined reflective materials are different in a use requiring the surface continuity of reflective materials, it is a preferable aspect to cover a difference part by one reflective material and to block the difference part with a weather strip material. An example in which the difference in the surface shape is not particularly processed is shown in FIG. 17, and an example in which the difference part of the surface shape is blocked is shown in FIGS. 18 and 19. It is a preferable aspect to superpose and use the combined reflective materials so as to obtain the continuity of the functional side in the difference part. Examples superposed and used are shown in FIGS. 20 and 21.

A reflector for lighting of the first aspect comprises a reinforcing material having flexibility in addition to the reflective material 1, and is characterized in that the reinforcing material connects the bottom parts of concave parts with each other from the back side of the side of the one surface of the reflective material 1 to reinforce the uneven shape. The reflector for lighting provided with flexibility, lightweight property and shape holding property as the polymer material can be realized by the provision of the constitution.

The raw material of the reinforcing material can be suitably selected from materials having flexibility such as a polymer membrane, a cloth and a nonwoven fabric according to the use.

It is a preferable aspect to apply functionality such as reflection, light shielding, heat transmission, heat dissipation, electric conduction and insulation to the reinforcing material according to the use. For example, it is preferable that the reinforcing material also satisfies the reflective performance as the reflective material.

The raw material of the above reflective material can be also preferably used as the raw material of the reinforcing material.

When disposability and recycling efficiency are taken into consideration, it is a preferable aspect to use the same system of polymer material as the reflective material for the reinforcing material. For example, it is preferable that the reflective material 1 and the reinforcing material are made of the polyester film in view of excellent weight saving of the reflector and stability of raw material physical properties in addition to excellent disposability and recycling efficiency.

Furthermore, it is particularly preferable that the polymer material made of the same main components as those of the reflective material is used for the reinforcing material.

As the aspect of the reinforcement, whether a reinforcing material reinforces the whole reflective material or the reinforcing material reinforces partially can be suitably selected according to the use. For example, it is one of preferable aspects to connect partially using the tape-like reinforcing material for weight saving and the reduction of the amount used. In the case where the simplification of a production process is meant and in the use where high shape holding property is required for the reflector for lighting, it is a preferable aspect to integrate the whole by the reinforcing material.

Whether the whole contact surface of the reflective material and reinforcing material is integrated or partially integrated needs only to be suitably selected according to the use or the constituent raw material. It is a preferable aspect to integrate the whole contact surface of the reflective material and reinforcing material so as to integrate firmly, and it is preferable to partially integrate since the heat shrinkage ratio difference and the heat expansion ratio difference are absorbed and it is difficult to generate the distortion of structure as the whole reflector for lighting.

A means for integrating the reflective material and the reinforcing material needs only to be suitably selected according to the use, and examples thereof include a binder, an adhesive, heat fusion, hook stop, bis stop and sewing machine engagement. For example, it is one of preferable aspects to integrate the reinforcing material formed of a polyester biaxial drawing film with the reflective material using the binder since the reflective material is not degraded by a thermal or physical damage.

When the reflector for lighting contains the above-mentioned plurality of reflection materials, it is preferable to contain the connection material for connecting them for preventing a desired optical characteristic from being ruined by the position gap of the reflection material.

The raw material of the connection material can be suitably selected from a polymer membrane, a cloth, a nonwoven fabric, FRP and a metal foil or the like according to the use. It is a preferable aspect that the connection material shows flexibility for preventing the generation of distortion due to shock or the like received during transportation and work and enabling the reflector for lighting to follow to modification so as to go along a desired shape.

It is a preferable aspect to apply functionality such as reflection, light shielding, heat transmission, heat dissipation, electric conduction and insulation to the connection material according to the use. For example, it is preferable that the connection material also satisfies the reflective performance as the reflective material.

The raw material of the above reflective material can be also preferably used as the raw material of the reinforcing material.

It is preferable that the reinforcing material serves as the role of the connection material for enabling the improvement in reliability, weight saving and cost down by simplifying the constitution of the reflector.

When disposability and recycling efficiency are taken into consideration, it is a preferable aspect to use the same system of polymer material as the reflective material for the connection material. For example, it is preferable that the reflective material 1, the reinforcing material and the connection material are made of the polyester film in view of excellent weight saving of the reflector and stability of raw material physical properties in addition to excellent disposability and recycling efficiency.

Furthermore, a polymer material made of the same main components as those of the reflective material is particularly preferably used for the connection material.

Referring to whether one connection material connects all of the plurality of reflective materials or connects partially, when the connection material has flexibility and serves as the role of the reinforcing material, the connection material can be suitably selected according to the use as the above reinforcing material. On the other hand, when the connection material does not have flexibility, it is preferable that the connection material is partially arranged so that the flexibility as the reflector is not inhibited.

Whether the whole of the contact surface of the reflective material and connection material is integrated or partially integrated needs only to be suitably selected according to the use or the constituent raw material. It is a preferable aspect to integrate the whole contact surface of the reflective material and reinforcing material so as to integrate firmly, and it is preferable to partially integrate since the heat shrinkage ratio difference and the thermal expansion ratio difference are absorbed and it is difficult to generate the distortion of structure as the whole reflector for lighting.

A means for integrating the reflective material and the reinforcing material needs only to be suitably selected according to the use, and examples thereof include a binder, an adhesive, heat fusion, hook stop, bis stop and sewing machine engagement. For example, it is one of the preferable aspects to integrate the reinforcing material formed of a polyester biaxial drawing film with the reflective material using the binder since the reflective material is not degraded by a thermal or physical damage.

Figure 22:
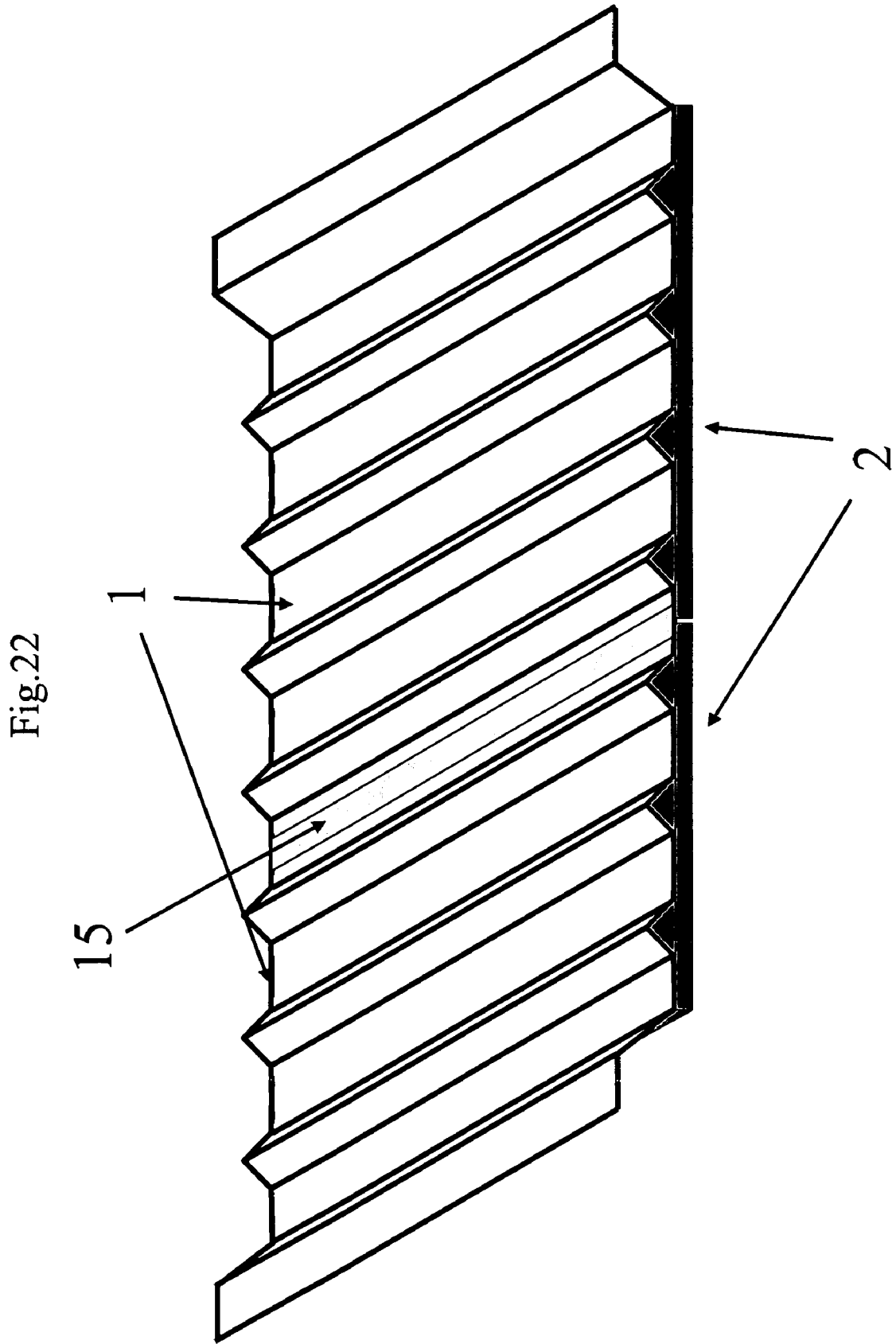
FIG. 22 is a conceptual view of an example in which a function of a weather strip material is applied to a connection material.

It is also one of preferable aspects to apply the function of the above weather strip material to the connection material. An example in which the function of the weather strip material is applied to the connection material is shown in FIG. 22.

Figure 23:
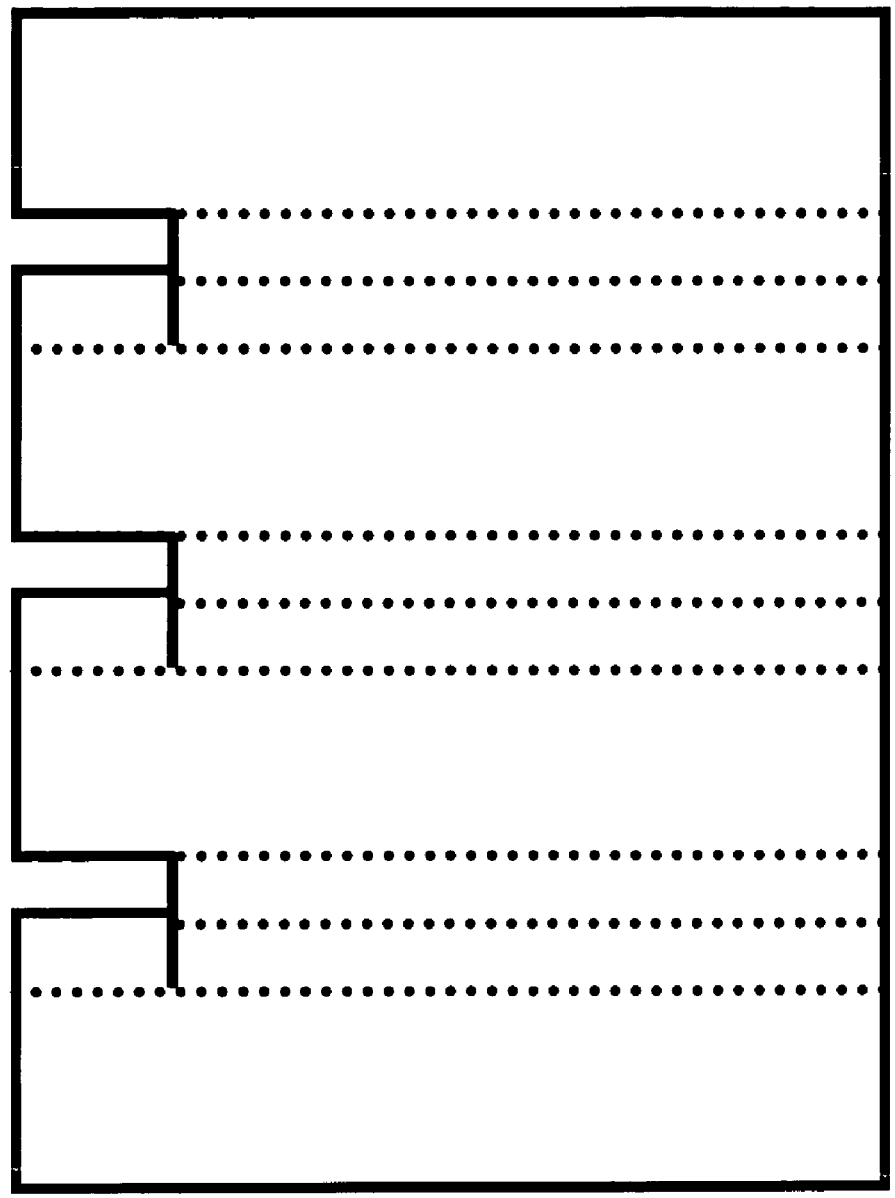
FIG. 23 is a conceptual view of an example of a cutting shape of a reflective material.
Figure 24:
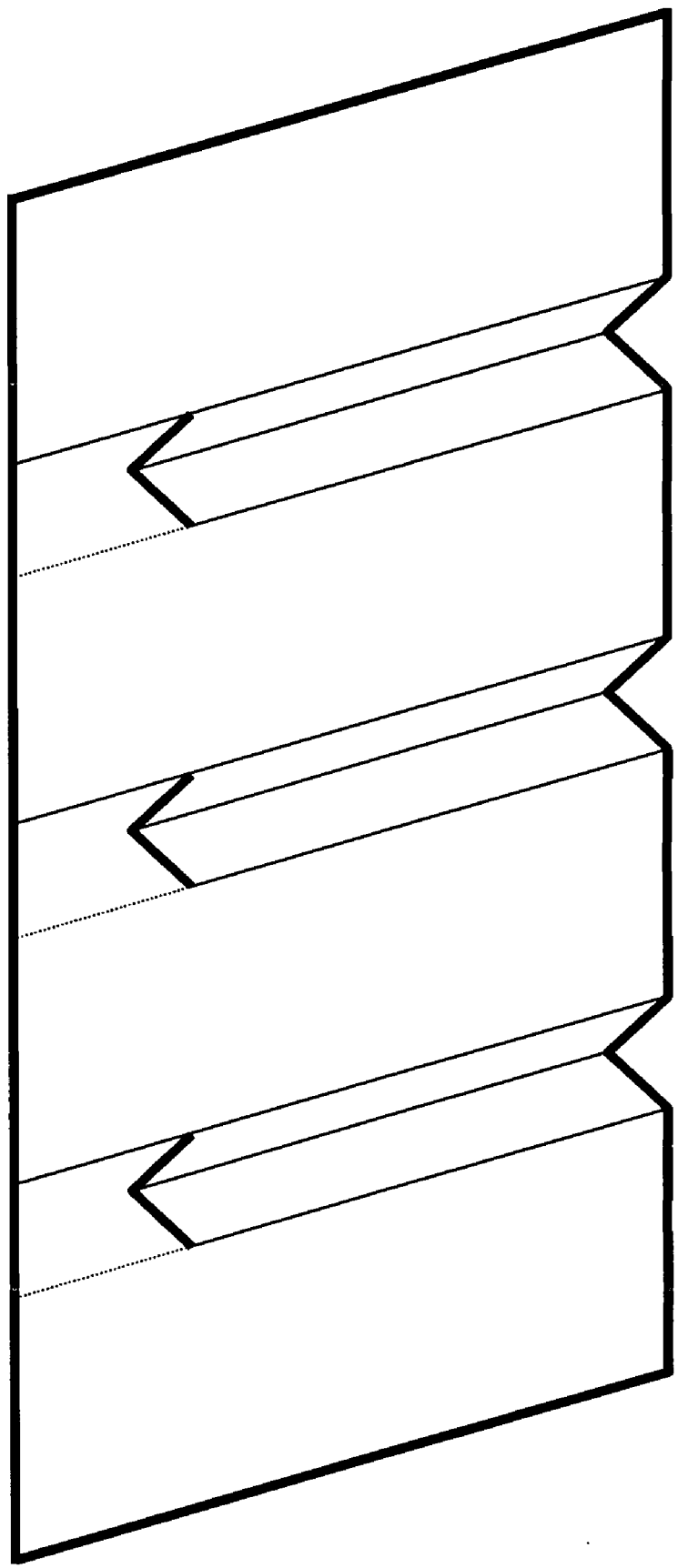
FIG. 24 is a conceptual view of a reflective material 1 obtained by applying ridge-shaped unevenness to a reflective material cut into the cutting shape of FIG. 23.
Figure 25:
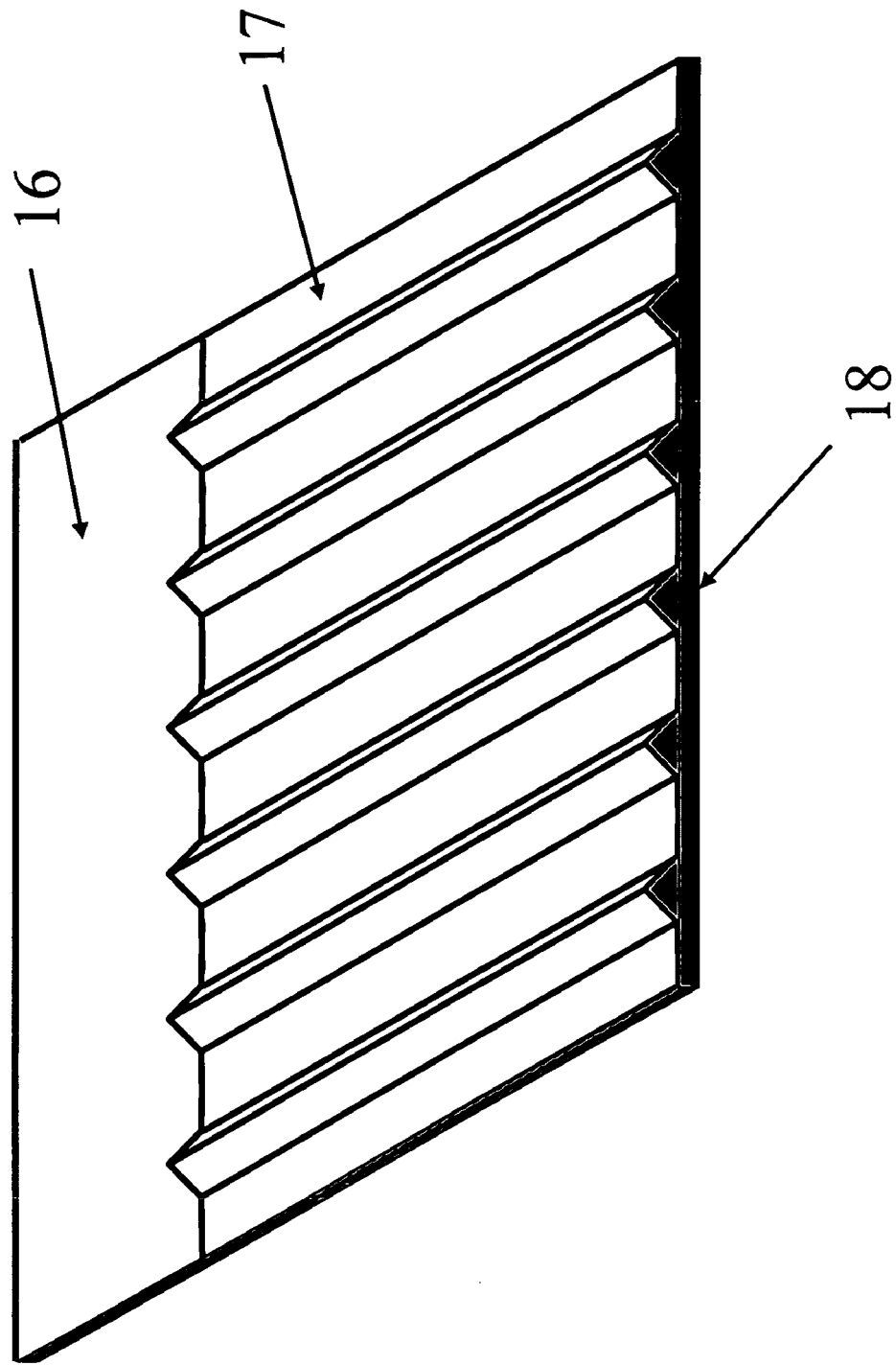
FIG. 25 is a schematic view of Example 6.

It is possible to realize a reflector for lighting having a complicated shape by reinforcing the reflective material 1 cut out into a shape as shown in FIG. 23 using the reinforcing material after applying the ridge-shaped uneven shape of FIG. 24 to the reflective material 1.

Next, in the reflector for lighting of a second aspect, the reflective material forms a side part continuing from the bottom part of the reflector, and has a groove formed on the back side of the side of the one surface on the boundary of the bottom part and side part. Though the conventional article adopts a perforated line which usually have a penetrated part on the boundary of the bottom part and side part, the adoption of the groove can prevent damage from the boundary of the bottom part and side part when installing the reflector and correcting the wrong installation while having the good installation property following the internal shape of a lighting case. Also, it is a preferable aspect so as to prevent the remarkable degradation of surface shape and quality of the material such as fracture on the boundary of the bottom part and side part to faithfully reproduce the optical design. It is preferable that the boundary of the bottom part and side part has substantially no penetrated part in view of the prevention of light leaking from the penetrated part.

As the groove and reflective material in the second aspect, those in the above first aspect can be used.

It is also preferable that the first and second aspects are combined.

In the reflector for lighting, for maintaining the optical characteristic at the time of the design, the size of the long side of the bottom side and size of the short side of the bottom side before and after exposure under the environment of 70° C. and 90% RH for 24 hours are respectively set to W0, W, L0, L. When the absolute values of the difference of the amount of dimensional change before and after exposure are set to $\Delta W(=|W0-W|)$ and $\Delta L(=|L0-L|)$, $\Delta W/W0 \leq 0.02$ and $\Delta L/L0 \leq 0.02$ are preferable, $\Delta W/W0 \leq 0.01$ and $\Delta L/L0 \leq 0.01$, are more preferable, and $\Delta W/W0 \leq 0.007$ and $\Delta L/L0 \leq 0.007$ are even more preferable.

When the constituting material contains a thermoplastic polymer as the main components for obtaining heat dimensional stability, it is preferable to perform a heat fixation to the shape of the reflector at a using temperature or more, preferably at the temperature of 70° C. or more.

Since the reflector for lighting can easily obtain the three-dimensional structure reflecting any optical design corresponding to various light source shapes, the reflector for lighting can be used as a particularly preferable aspect as the back light device for displaying information such as the light source for signboards and the back light for liquid crystal TV.

EXAMPLES

Measurement and Valuation Method (1) Average Reflectance

As a spectroscopy type color difference meter, an SE-2000 type color difference meter manufactured by Nippon Denshoku Industries Co., Ltd. was used. The spectroreflectance of the wavelength range of 400 to 700 nm was measured at intervals of 10 nm according to JIS Z 8722, and the arithmetic average value of each measured value was calculated.

(2) Heat Shrinkage Ratio of Reflective Material or the Like

Under a drying heat of 150° C., a heat treatment was performed for 30 minutes, and the shrinkage ratio to the original length before heat treatment was calculated. The number of samples was set to n=5.

(3) Curvature Radius R of Top of Apex Part

Figure 7:
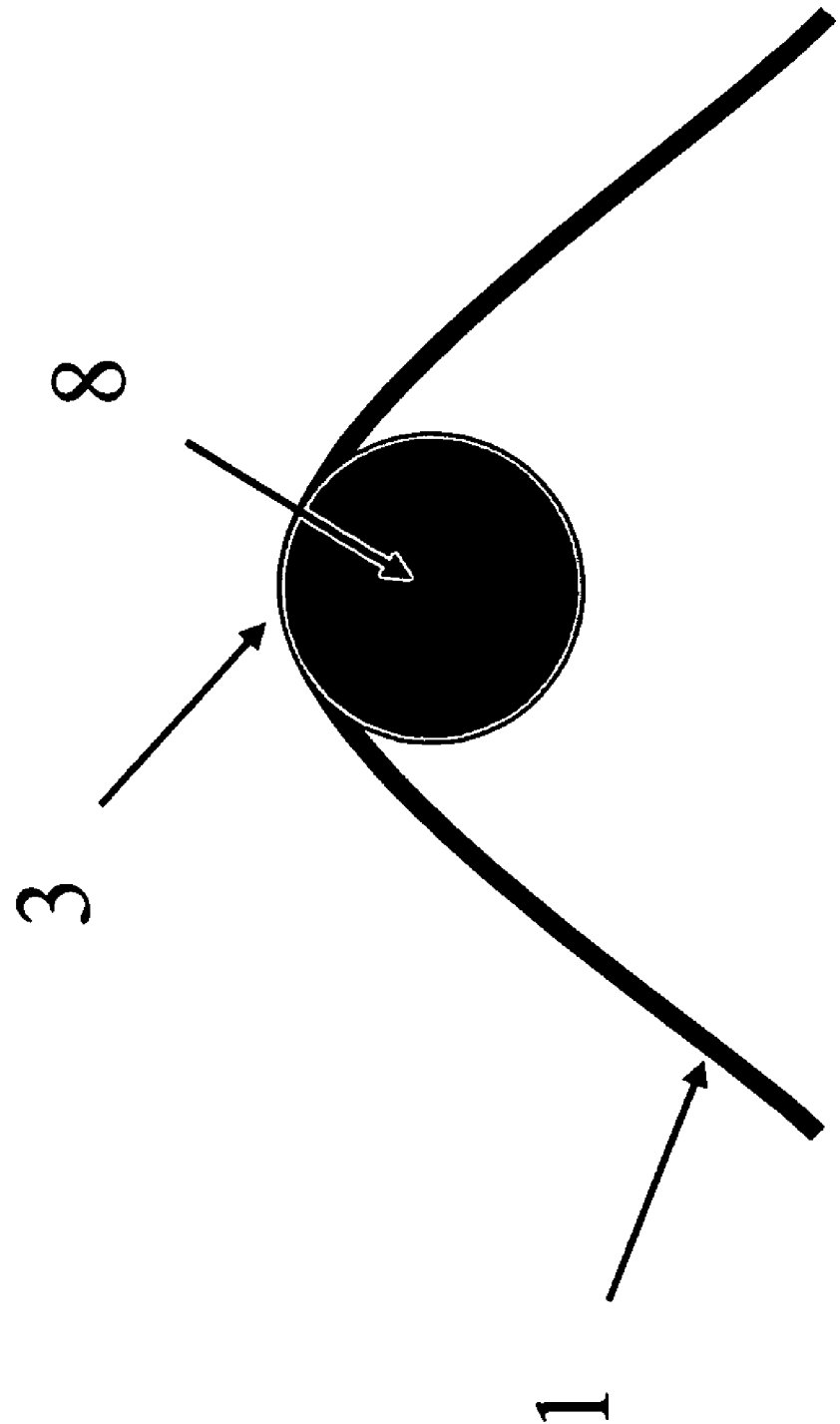
FIG. 7 is a conceptual sectional view of a top part of an apex part.

The section of the ridge shape in the reflective material 1 was took by a digital camera (IXY DIGITAL 400 manufactured by Canon Inc.) with the scale of a straight measure (manufactured by Shinwa Rules Co., Ltd., C type JIS 1 class, 150 mm). The diameter $\phi$ of a circle (refer to FIG. 7) along the curvature of the top part from a photograph expanded by 10 times was measured by a micrometer caliper. The magnification X was calculated from the scale of the straight measure measured similarly, and the actual curvature radius R ($=\phi/2X$) was calculated. When a part continuing with a part in which the raw material was penetrated according to a perforated line existed, the curvature radius was calculated based on the part in which the raw material continues. The calculated curvature radius was evaluated by the following basis.

A: $R \leq 0.7$ mm

B: $0.7$ nm$<R \leq 1.0$ mm

C: $1.0$ mm$<R$ (4) Appearance of Fold Line (Examples 1 to 5, Comparative Examples 1, 2)

An overview observation and expansion observation (peak magnifying glass 22×, manufactured by Tokai Industry is used) were performed for all the fold lines formed in the reflective material 1, and all the fold lines were evaluated by the following basis.

(Overview Observation)
- A: Remarkable wrinkles are not observed on any fold line, and the fold lines are formed on the shape of a straight line.
- B: Though wrinkles exist on at least some fold lines, the fold lines are mostly formed in the shape of a straight line.
- C: A part in which the fold line is in zigzags by large wrinkles exists on at least some fold lines.

(Expansion Observation)
- A: Remarkable wrinkles are not observed on any fold line.
- B: Wrinkles occur on at least some fold lines.
- C: Cracks occur on at least some fold lines.

(5) Appearance of Fold Line (Examples 10, 11, Comparative Examples 8 to 10)

An overview observation and an expansion observation (peak magnifying glass 22× manufactured by Tokai Industry is used) were performed for the boundary part of the bottom part and the side part in a reflective material forming the bottom part of a reflector and the side part continuing from the bottom part, and the boundary part was evaluated by the following basis.
- A: Remarkable wrinkles are not observed, and the boundary is formed in the shape of a straight line.
- B: Though wrinkles exist, the boundary is mostly formed in the shape of a straight line.
- C: A part in which the boundary is in zigzags by large wrinkles exists.

(6) Optical Leak (Examples 10, 11, Comparative Examples 8 to 10)

The boundary part of the above item (5) was held up to a fluorescent light, and visual observation was performed to evaluate by the following basis.
- A: The optical leak is not observed on the boundary.
- B: Though the random optical leak is not observed on the boundary, the optical leak of an equal pitch is observed.
- C: The random and remarkable optical leak is observed on the boundary.

(7) Opening/Closing Performance of Side Part (Examples 10, 11 and Comparative Examples 8 to 10)

Opening and closing were performed for the boundary part of the above item (5) in the following range. Referring to the observation of the boundary part, an overview observation and an expansion observation (peak magnifying glass 22× manufactured by Tokai Industry was used) were performed from both the front and reverse sides of the reflective material, and the boundary part was considered as remarkable damage according to the occurrence and growth or the like of the crack or the wrinkles reaching to parts other than the fold line. The angle on the following condition means an angle on the boundary part of the bottom part and side part.
- C: Remarkable damage is observed on the fold line of the boundary part after opening and closing 10 times in the range of 70 degrees to 100 degrees.
- B: Though remarkable damage is not observed in the opening and closing of the above item C, remarkable damage is observed on the fold line of the boundary part after opening and closing 10 times in the range of 50 degrees to 110 degrees.
- A: Remarkable damage was not observed in the opening and closing of the above items C, B.

(8) Dimensional Change ($\Delta D$, $\Delta H$) (Examples 1 to 5, Comparative Examples 1, 2)

The material was exposed under the environment of 70° C. and 90% RH for 24 hours. The intervals between the tops of the adjoining apex parts before and after exposure were set to D0 and D. The heights from the bottom part to the tops of the apex part before and after exposure were measured as H0 and H by a micrometer caliper. The dimensional change was evaluated by absolute value $\Delta D$ (=|D0−|) and $\Delta H$ (=|H0−H|) of the difference of the size before and after the exposure according to the following basis.
- C: more than 1.0 mm.
- B: 1.0 mm or less but more than 0.5 mm
- A: 0.5 mm or less.

(9) Dimensional Change ($\Delta W/W0$, $\Delta L/L0$) (Examples 10, 11, Comparative Example 8)

The material was exposed under the environment of 70° C. and 90% RH for 24 hours. The long side sizes of the bottom part before and after exposure were set to W0 and W. The short side sizes of the bottom part before and after exposure were set to L0 and L, and the absolute values of the difference of the size before and after exposure were set to $\Delta W$ (=|W0−W|) and $\Delta L$ (=|L0−L|). The dimensional change was evaluated by the value of $\Delta W/W0$ and $\Delta L/L0$ according to the following basis.
- C: Either of $\Delta W/W0$ and $\Delta L/L0$ exceeds 0.2.
- B: Though both $\Delta W/W0$ and $\Delta L/L0$ are 0.2 or less, either exceeds 0.007.
- A: Both $\Delta W/W0$ and $\Delta L/L0$ are 0.007 or less.

(10) Installation Property Flexibility (Examples 6, 7, Comparative Examples 3 to 6)

A wire model supposing a lamp interval of 26 mm, a radius of a bent part of 13 mm, a length of a direct pipe part of 132 mm and a U-shaped cold cathode tube of 2 mm $\phi$ was prepared. It was evaluated whether an evaluation object could be installed at the position of the distance of 3 mm between the sample bottom surface and the lamp by making the direct pipe part of a lamp model be located so as to become level to the side of 150 mm of the sample.
- A: It is possible to install so that no physical interference occurs.
- B: A physical interference occurs and it is impossible to install.

Figure 26:
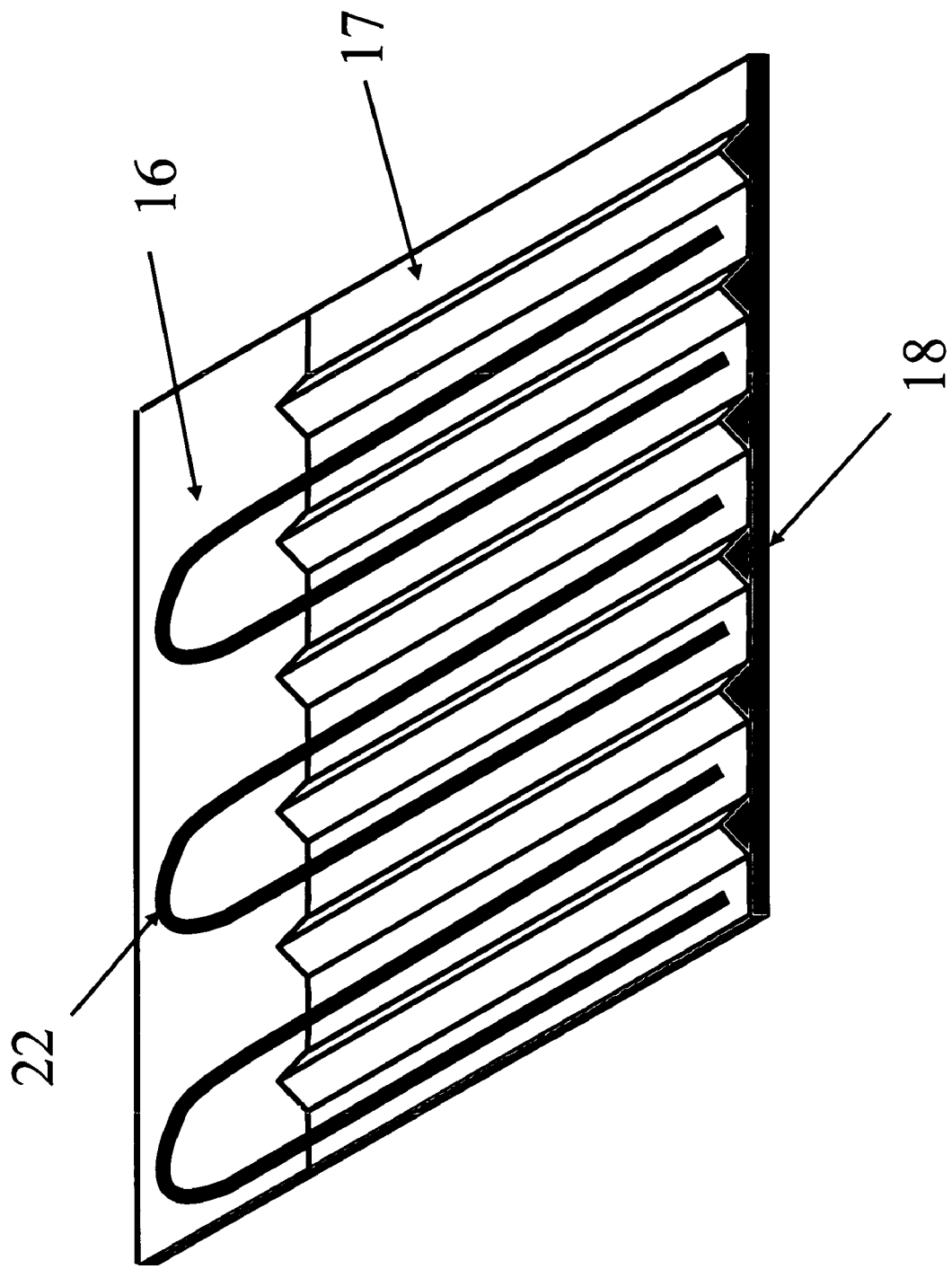
FIG. 26 is a conceptual view when evaluating the installation property flexibility of Example 6.

The conceptual view of installation of Example 6 is shown in FIG. 26.

(11) Installation Stability (Examples 6, 7, Comparative Examples 3 to 6)

Figure 28:
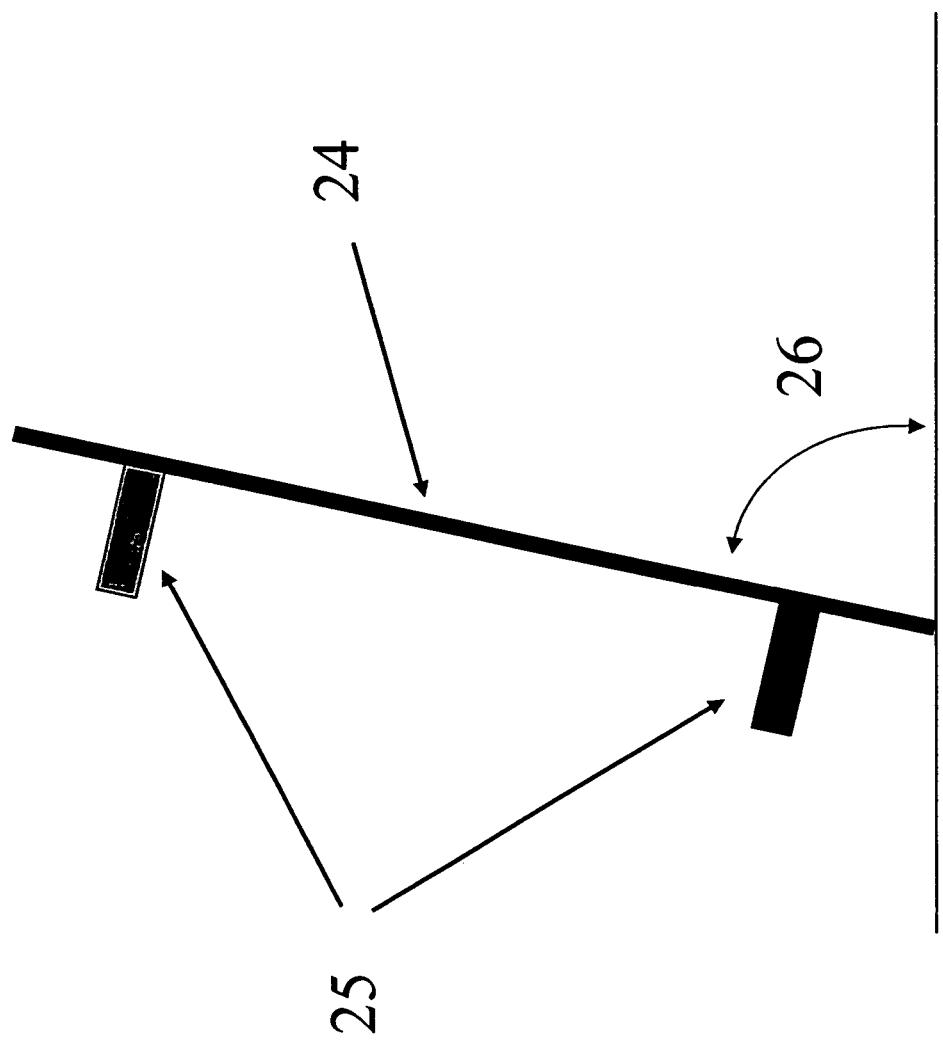
FIG. 28 is a conceptual view when viewing an installation stability evaluation stand from the side.

An aluminum plate of 170 mm×190 mm having a thickness of 1 mm was prepared. Metal pins having 5 mm $\phi$ and a length of 20 mm were stood at two places corresponding to a diagonal of a rectangle 130 mm×150 mm located at the inner side of 20 mm from each side. The aluminum plate was installed at the angle of 70 degrees so that the long side and the metal pin side were located at the upper side and the front side, respectively, to constitute an installation stability evaluation stand. The schematic view of the installation stability evaluation stand from the side is shown in FIG. 28.

To the evaluation object, holes of 6 mm $\phi$ were formed at two places corresponding to the diagonal of the rectangle 130 mm×150 mm located at the inner side of 10 mm from each side and becoming the same as the position of the pin of the installation stability evaluation stand to obtain a sample for evaluating installation stability.

After setting the hole of each sample to the installation stability evaluation stand so as to pass the hole of each sample to the metal pin, the installation stability was evaluated by lightly swaying the installation stability evaluation stand to confirm the shift of the sample.

A: It was possible to stably set.
B: The sample was shifted.

Figure 27:
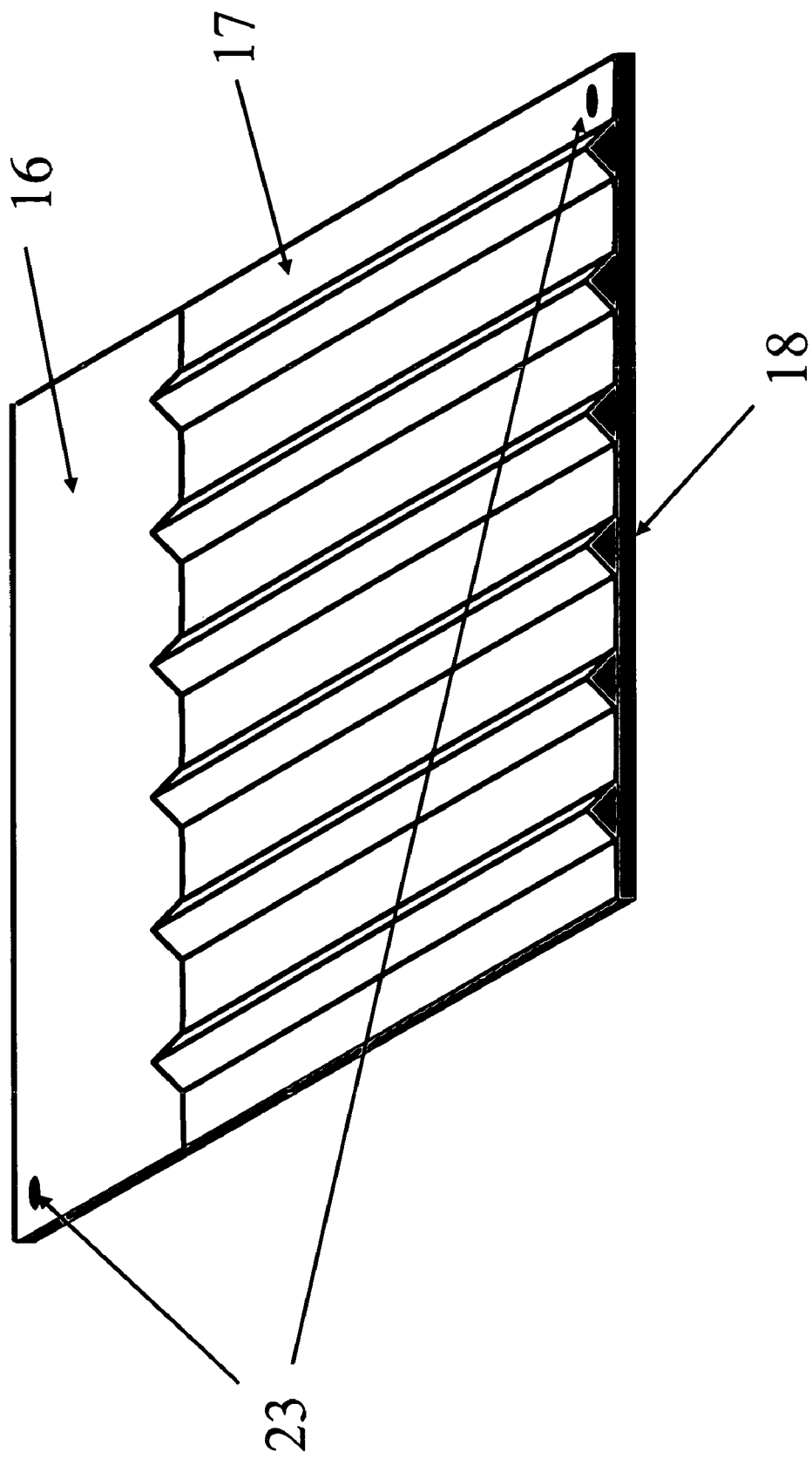
FIG. 27 is a conceptual view of a sample for evaluating installation stability in which holes are formed in Example 6.

The conceptual view of the reflector for lighting of Example 6 in which the hole is formed and which is the sample for evaluating installation stability is shown in FIG. 27.

(12) Installation Adaptability (Examples 6, 7, Comparative Examples 3 to 5)

After pushing the sample against the surface of the steel pipe for 5 minutes to deform the sample using a steel pipe having a diameter of 20 cm so that the short side of the sample is parallel to the length direction of the steel pipe, the back surface (reinforcing material side) of the sample was immediately set to the glass side, and each sample was placed on a plane glass plate. After 10 minutes after placing, the sample shape on the plane glass was observed, and the installation adaptability was evaluated by the following basis.

A: The sample is installed along the glass surface shape.
B: The center of the sample long side does not thoroughly contact with glass.

(13) Back Light Front Luminance (Examples 6, 7, Comparative Examples 3 to 6)

A measurement was performed by using 201BLM02 (the interval of a cold cathode tube: 26 mm) manufactured by Tama Electric Co., Ltd. as a direct below type back light. The ready-made film stuck on the inside of the back light was removed, and the below-mentioned material a in which a space of 150 mm×170 mm is formed near the center so as not to interfere with the support part material of the cold cathode tube was stuck. The side of 150 mm of the space was arranged so that it was parallel to the cold cathode tube, and so that one end part thereof was set to 7 mm from a place where the central line of the nearest inside cold cathode tube was taken down to the installation plane. The reflector for lighting of a measurement object was stuck by a double-stick tape into the space according to one side of 170 mm. In Examples 6, 7 and Comparative Examples 3, 5, 6, the edge line part of the convex part of the ridge-shaped uneven shape was set so as to be located in the middle of the cold cathode tubes adjoining each other. The reflective material 1 and reflective material 2 of Comparative Example 4 were stuck so as to have the same arrangement as arrangement of the reflective material 1 and reflective material 2 of Example 6. A transparent PMMA plate was attached in that state, the cold cathode-ray tube was turned on for 1 hour, and the light source was stabilized. EYESCALE-3 (manufactured by Imaizumi company) was used as a luminance irregularity measuring instrument from the transparent PMMA plate side front, and the distance between a camera and the surface of a back light unit, the lens diaphragm of the camera and shutter speed were respectively set to 1 m, f16 and 1/250 seconds to measure luminance (cd/m$^2$). The effective luminance data range was set to a square part surrounded by 78 mm of the center of 170 mm in the direction perpendicular to the cold cathode tube and 80 mm of the center of 150 mm in the direction parallel to the cold cathode tube.

The obtained luminance data was analyzed as a table in which the direction level to the cold cathode tube was set to a sequence and a perpendicular direction to a cold cathode tube was set to a line. When the luminance data of each line was analyzed so as to evaluate the luminance distribution in the direction perpendicular to the cold cathode tube, the luminance distribution in which the luminance was the maximum value was showed in a part which is in agreement with the position of the cold cathode tube. The maximum vale of the luminance was made into the peaks (P×1 to P×n, n shows the number of peaks, and x shows the x-th line). The minimum value which becomes the lowest luminance between the adjacent peaks was made into a bottom (Q×1 to Q×m; m shows the number of bottoms; x shows the x-th line; and Q×1 is set to the value of the minimum luminance between P×1 and P×2). The line peak luminance average value P×A and line bottom luminance average value Q×A of the direction level to the cold cathode tube were calculated by the following formulae.

$$P \times A = (P \times 1 + P \times 2 + \ldots + P \times n)/n$$

$$Q \times A = (Q \times 1 + Q \times 2 + \ldots + Q \times m)/m$$

26 mm minute about the peak was made into 1 cycle, and the line average luminance S×A was set by the average of the luminance for S cycle (S is an integer). In this Example and Comparative Example, n=m=S=3 was equivalent to a width of 78 mm. Next, in the effective luminance data range, a peak luminance average value, a bottom luminance average value and an average luminance were obtained by calculating the average value of the values of P×A, Q×A and S×A of each line. Each numerical value of the front luminance characteristic shown in Table 3 is preferably larger.

Figure 29:
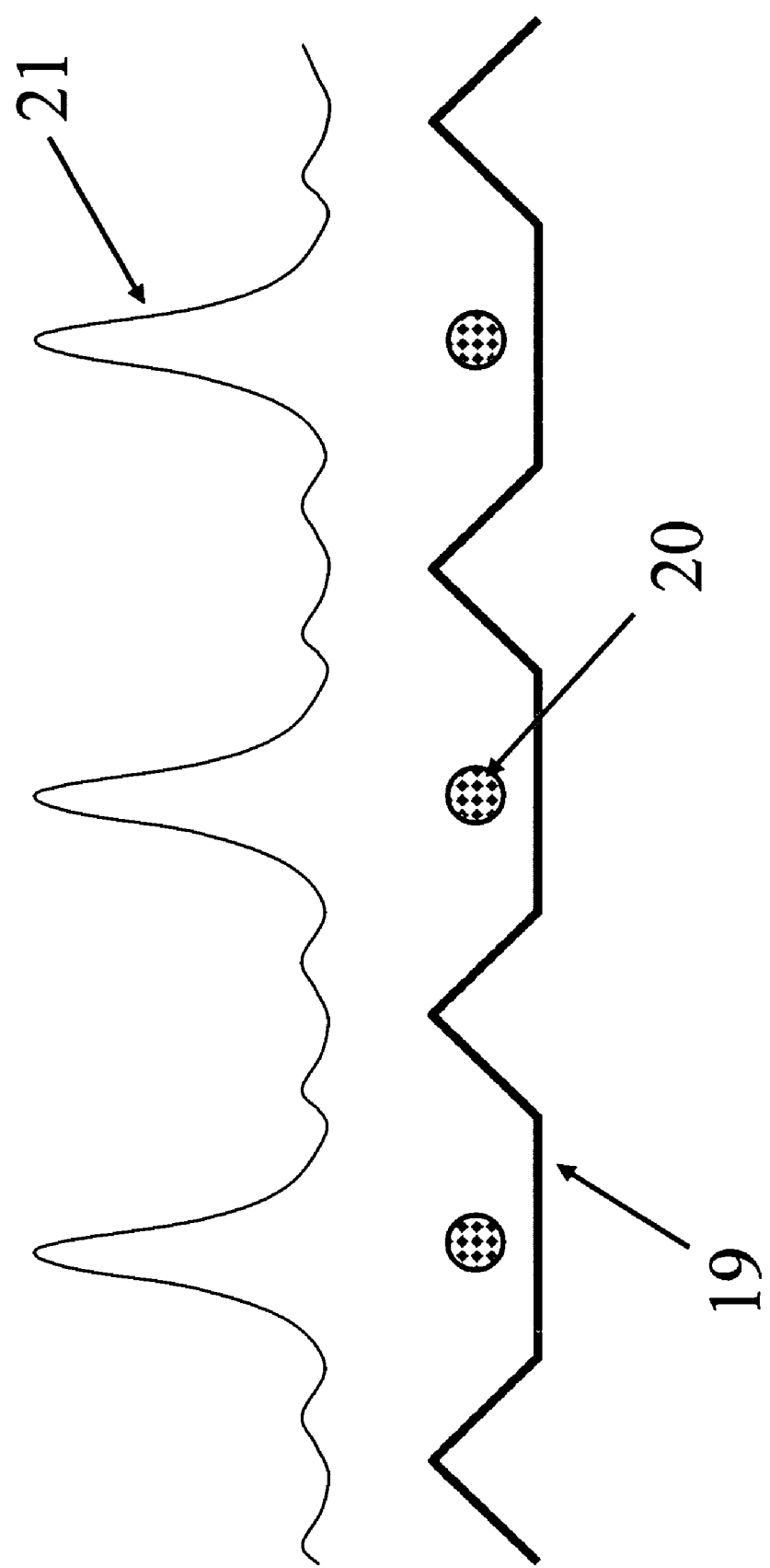
FIG. 29 represents the superimposition of the conceptual cross-sectional view and front luminance distribution conceptual view of a cold cathode tube and sample when evaluating the front luminance of a back light.

FIG. 29 shows a cross section of the cold cathode tube and sample when evaluating the sample and a conceptual view in which corresponding luminance distribution is superimposed.

(14) Optical Dissolubility (Examples 8, 9, Comparative Example 7)

Figure 35:
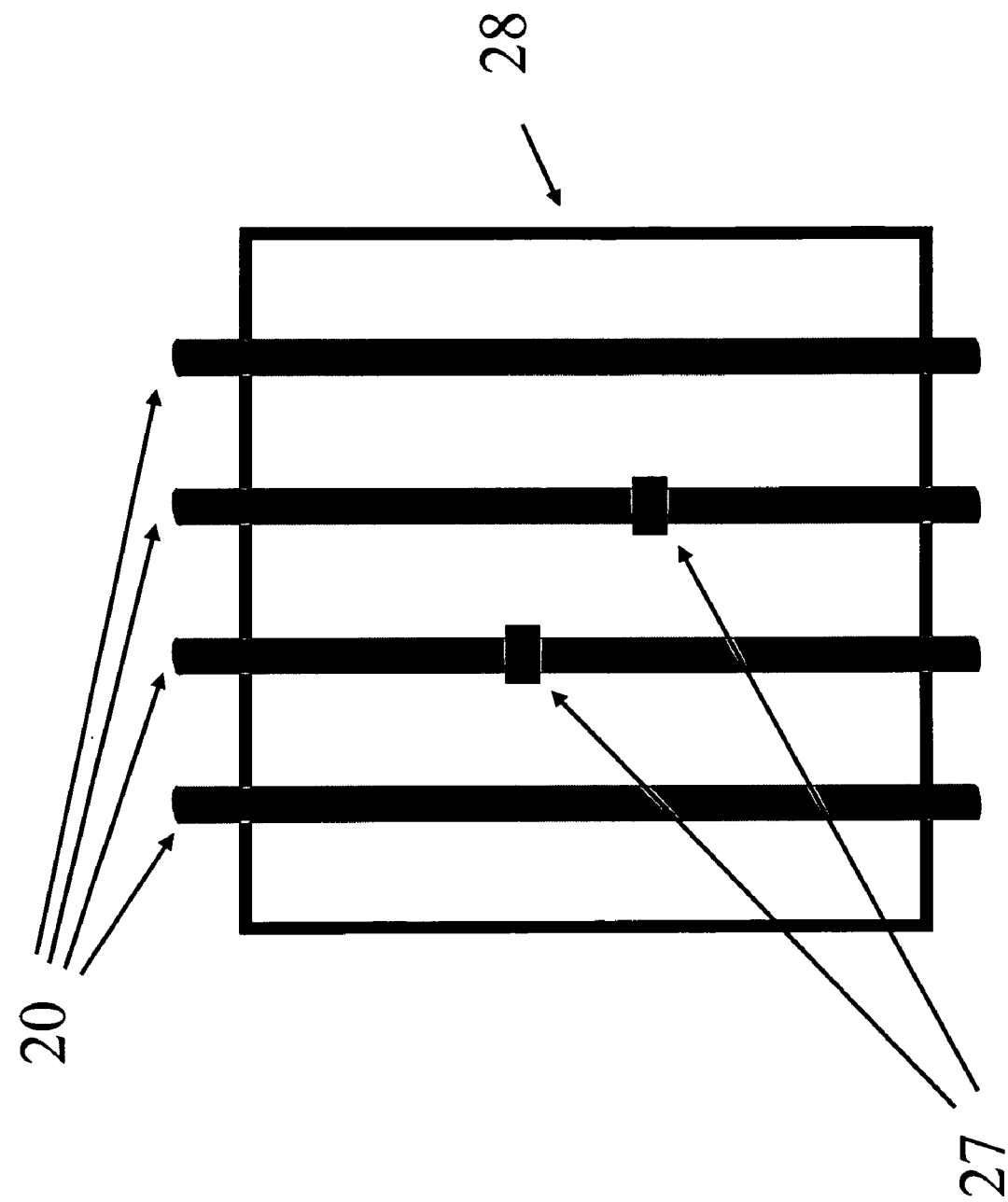
FIG. 35 is a conceptual view of a back light setting in a front luminance evaluation 2 of a back light.

A measurement was performed by using 201BLM02 (the interval of a cold cathode tube: 26 mm) manufactured by Tama Electric Co., Ltd. as a direct below type back light. The ready-made film stuck on the inside of the back light was removed, and the below-mentioned material a in which a space of 100 mm×100 mm is formed near the center so as not to interfere with the support part material of the cold cathode tube was stuck. The space was set to a position into which four cold cathode tubes was put. The middle between two central cold cathode tubes is set to the center of one side of the space, and the cold cathode tube was made parallel to the other side of the space. The reflector for lighting of a measurement object was stuck by a double-stick tape into the space. In Examples 8, 9, the edge line part of the convex part of the ridge-shaped uneven shape was set so as to be located in the middle of the cold cathode tubes adjoining each other. Black tapes having a width of 5 mm were wound around two cold cathode tubes so as to become the diagonal of a rectangle of 26 mm×15 mm in a space central of 100 mm×100 mm. As shown in a schematic view of FIG. 35, one obtained by processing the below-mentioned material a in which a notch was formed in the position of the cold cathode tube to cylindrical shape of 100 mm×100 mm so as to block between a reflective material side of the back light and a transparent PMMA plate attached in the upper part was set so as to surround the reflector sample for lighting. The transparent PMMA plate was attached in that state, and the cold cathode-ray tube was turned on for 1 hour to stabilize the light source. EYESCALE-3 (manufactured by Imaizumi company) was used as a luminance irregularity measuring instrument from the transparent PMMA plate side front, and the distance between a camera and the surface of a back light unit, the lens diaphragm of the camera and shutter speed were respectively set to 1 m, f16 and 1/250 seconds to measure luminance (cd/m$^2$).

Figure 36:
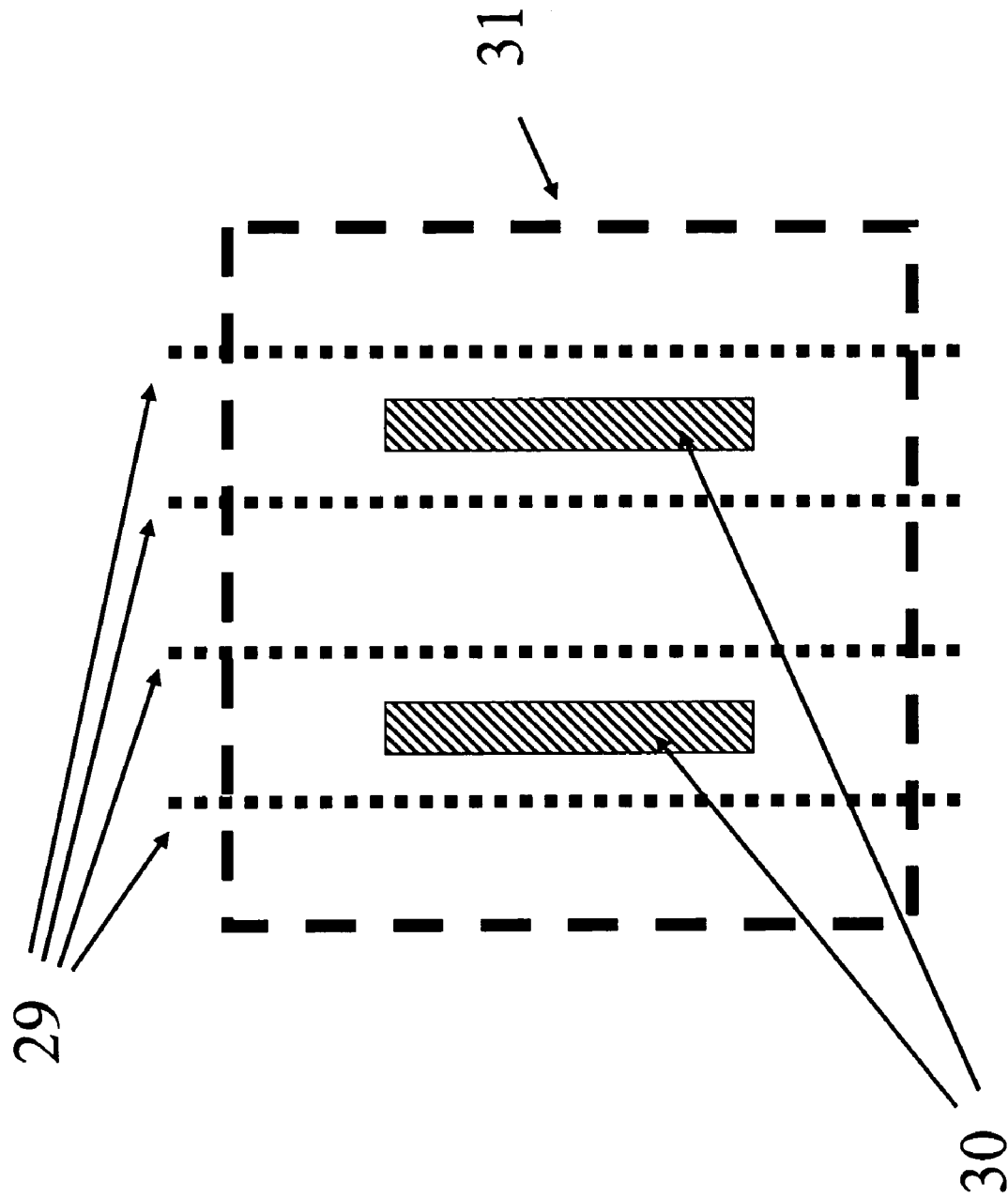
FIG. 36 is a conceptual view of a luminance measuring range in a front luminance evaluation 2 of a back light.

The obtained luminance data was analyzed as a table in which the direction level to the cold cathode tube was set to a sequence and a perpendicular direction to a cold cathode tube was set to a line. When the luminance data of each line was analyzed so as to evaluate the luminance distribution of a direction perpendicular to the cold cathode tube, the luminance distribution in which the luminance became the maximum value was showed in a part which is in agreement with the position of the cold cathode tube. The maximum value of the luminance was set to peak (P×1 to P×n, n show the number of peaks, and x shows x-th line). The sampling parts of the luminance were 15 sequences between the peaks. The number of the parts at which the luminance was sampled in the direction parallel to the cold cathode tube was 54 lines. The luminance data of 9 sequences of the center of 15 sequences and 24 lines of the center of 54 lines were set to the effective data range among data of 15 sequences and 54 lines between the peaks. Two places shown in FIG. 36 were used as the effective data range in the measuring range, and each average was used for evaluation. The evaluation was performed by using the value obtained by dividing the difference between the maximum luminance and minimum luminance of the sequence direction in the effective data range by the average luminance as Z. The larger value of Z is preferable in view of the separation of light.

[Material]

Materials used in Examples and Comparative Examples are summarized below.

(Material a)

193E60V (manufactured by Toray Industries, Inc.) obtained by coating a light-resistant agent on a biaxial drawing PET film was used as a material a. The film thickness of the material a, the average reflectance and the heat shrinkage ratio of the longitudinal direction of a film were respectively 193 μm, 98% and 0.7%.

(Material b)

188E60L (manufactured by Toray Industries, Inc.) as a biaxial drawing PET film was used as a material b. The film thickness of the material b, the average reflectance and the heat shrinkage ratio of the longitudinal direction of a film were respectively 188 μm, 98% and 1.1%.

(Material c)

The material b was subjected to an anneal processing at 200° C. to form a material c. The heat shrinkage ratio of the longitudinal direction of a film of the material c was 0.6%.

(Material d)

188S10 (manufactured by Toray Industries, Inc.) as a biaxial drawing PET film was used as a material d. The film thickness of the material d was 188 μm, and the heat shrinkage ratio of the longitudinal direction of a film was 1%.

(Material e)

The material d was subjected to an anneal processing at 200° C. to form a material e. The heat shrinkage ratio of the longitudinal direction of a film of the material e was 0.5%.

Example 1

(Reflective Material 1)

A ball pen having a ball diameter of 0.5 mm was pushed to a fold line part in the shape of a straight line from the contrary side of a light-resistant agent-containing layer of a material a to form a pressing mark, and a groove was formed. Then, the material a is bent so that the ridge-shaped uneven shape in which the interval W of the apex part is 33 mm, the fold line angle of the apex part is 90 degrees, the height H is 8 mm and each surface is constituted by a plane is formed to form a reflective material 1.

(Reinforcing Material)

A double-sided adhesive tape (# 500 manufactured by NITTO DENKO CORPORATION) was stuck on the whole area of one surface of the material d to constitute a reinforcing material.

(Assembly of Reflector for Lighting)

The reinforcing material was stuck on the whole bottom part so that the bottom parts of the concave part of the reflective material 1 were connected to reinforce the reflective material 1.

The obtained reflector had extremely excellent characteristic as shown in Table 1.

Example 2

(Reflective Material 1)

The same reflective material 1 as one used in Example 1 was used.

(Reinforcing Material)

A double-sided adhesive tape (# 500 by NITTO DENKO CORPORATION) was stuck on the whole one surface of the material e to form a reinforcing material.

(Assembly of Reflector for Lighting)

The reinforcing material was stuck on the whole bottom part so that the bottom parts of the concave part of the reflective material 1 were connected to reinforce the reflective material 1.

The obtained reflector had extremely excellent characteristic as shown in Table 1.

Example 3

(Reflective Material 1)

The material e was stuck on the whole contrary side of a light-resistant agent-containing layer to the material a via a double-sided adhesive tape (# 500 manufactured by NITTO DENKO CORPORATION) to be made to compound. 5 mm of both sides of a part as a fold line of the composite film in the assembly of the reflector for lighting, that is, an attachment part of the material e having a width of 1 mm was removed to expose the back side of the reflective material a. Henceforth, the reflective material 1 was fabricated in the same manner as in Example 1.

(Reinforcing Material)

A double-sided adhesive tape (# 500 by NITTO DENKO CORPORATION) was stuck on the whole one surface of a material e to form a reinforcing material.

(Assembly of Reflector for Lighting)

The reinforcing material was stuck on the whole bottom part so that the bottom parts of the concave part of the reflective material 1 were connected to reinforce the reflective material 1.

The obtained reflector had extremely excellent characteristic as shown in Table 1.

Example 4

(Reflective Material 1)

The material a was bent so that the light-resistant agent-containing layer of the material a is located at the front, and the shape of the ridge (e.g. the interval, fold line angle, height or the like of the apex part) was the same as those of Example 1 to form the reflective material 1.

(Reinforcing Material)

A double-sided adhesive tape (# 500 by NITTO DENKO CORPORATION) was stuck on the whole one surface of a material e to form a reinforcing material.

(Assembly of reflector for lighting)

The reinforcing material was stuck on the whole bottom part so that the bottom parts of the concave part of the reflective material 1 were connected to reinforce the reflective material 1.

Referring to the obtained reflector, wrinkles exist on the fold line as compared with Example 2, and the linearity is worsened.

Example 5

(Reflective Material 1)

A material e was stuck on the whole contrary side of the light-resistant agent-containing layer to the reflective material a via the double-sided adhesive tape (# 500 manufactured by NITTO DENKO CORPORATION) to be made to compound. A perforated line was formed on a part as the fold line to the composite film. Then, the material a was bent so that the shape of the ridge (e.g. the interval, fold line angle, height or the like of the apex part) was the same as those of Example 1 to form the reflective material 1.

(Reinforcing Material)

A double-sided adhesive tape (# 500 by NITTO DENKO CORPORATION) was stuck on the whole one surface of the material e to form a reinforcing material.

(Assembly of Reflector for Lighting)

The reinforcing material was stuck on the whole bottom part so that the bottom parts of the concave part of the reflective material 1 were connected to reinforce the reflective material 1.

Referring to the obtained reflector, as compared with the Example 2, the curvature radius R of the top of the apex part was large in a part in which the perforated line was not penetrated. Also, cracks were observed on the boundary line with perforated line, and the quality level was reduced.

Comparative Example 1

(Reflective Material 1)

A perforated line was formed on a part as a fold line so that the light-resistant agent-containing layer of the material a is located at the front. The material a was bent so that the shape of the ridge (e.g. the interval, fold line angle, height or the like of the apex part) was the same as those of Example 1 to form the reflective material 1.

(Reinforcing material)

The reinforcing material was not used.

The obtained reflector was unstable in that its size was changed significantly under heat and humidity.

Comparative Example 2

(Reflective Material 1)

An aluminum plate having a thickness of 0.5 mm was stuck on the whole contrary side of a light-resistant agent-containing layer to the material a via a double-sided adhesive tape (# 500 manufactured by NITTO DENKO CORPORATION) to be made to compound. The composite material was pressed by using a pressing machine, and the composite material was bent so as to have the same ridge shape (e.g. interval, fold line angle and height or the like of the apex part) as those of Example 1 so that the light-resistant agent-containing layer of the material a is located at the front side.

(Reinforcing Material)

The reinforcing material was not used.

The obtained reflector had a large curvature radius R of the top of the apex part.

Example 6

(Reflective Material 1)

The material a was cut off to 90 mm×206 mm, and pressing marks were formed from the contrary side of the light-resistant agent-containing layer by pressing a ball pen having a ball diameter of 0.5 mm so as to form the shape of a straight line parallel to the long side at the positions of 14 mm (9 mm, 9 mm, 14 mm)$_6$ (the subindex represents the number of repetitions) from the short side end to form a groove. Then, the material a was bent so that a ridge of which the section shape is an isosceles triangle having a base of 12 mm and two sides of 9 mm is formed to form a reflective material 1 of 90 mm×170 mm.

(Reflective Material 2)

The material a was cut off to 60 mm×170 mm to form a plane-like reflective material 2.

(Reinforcing Material and Connection Material)

The material c was cut off to 150 mm×170 mm, and a double-sided adhesive tape (#500 manufactured by NITTO DENKO CORPORATION) was stuck on the whole one surface thereof to form a reinforcing material which also serves as the role of a connection material.

(Assembly of the Reflector for Lighting)

On the reinforcing material, the reflective material 1 and the reflective material 2 were put in order as shown in FIG. 24, and were stuck via a double-sided adhesive tape to obtain a reflector for lighting of 150 mm×170 mm.

The obtained reflector for lighting had extremely excellent characteristic as shown in Table 2.

Example 7

A reflector for lighting was obtained in the same manner as in Example 6 except that the material c was replaced with the material d as a material for forming the reinforcing material and the connection material.

The obtained reflector for lighting had extremely excellent characteristic as shown in Table 2.

Comparative Example 3

A reflector for lighting was obtained in the same manner as in Example 6 except that the material c was replaced with an aluminum plate having a thickness of 1 mm as a material for forming the reinforcing material and the connection material.

The obtained reflector for lighting was inferior in installation adaptability as compared with Examples 6 and 7.

Comparative Example 4

(Reflective Material 1)

The reflective material 1 was not used.

(Reflective Material 2)

The material a was cut off to 150 mm×170 mm to form a plane-like reflective material 2.

(Reinforcing Material)

The same reinforcing material as that of Example 6 was used.

(Assembly of Reflector for Lighting)

A reflective material 2 was stuck on a reinforcing material via a double-sided adhesive tape to obtain a reflector for lighting of 150 mm×170 mm.

As compared with the Example 6, the obtained reflector for lighting was inferior in the luminance characteristic.

Comparative Example 5

(Reflective Material 1)

The material a was cut off to 150 mm×206 mm, and pressing marks were formed from the contrary side of the light-resistant agent-containing layer by pressing a ball pen having a ball diameter of 0.5 mm so as to form the shape of a straight line parallel to the long side at the positions of 14 mm (9 mm, 9 mm, 14 mm)$_6$ (the subindex represents the number of repetitions) from the short side end to form a groove. Then, the material a was bent so that a ridge having the section shape of an isosceles triangle having a base of 12 mm and two sides of 9 mm is formed to form a reflective material 1 of 150 mm×170 mm.

(Reflective Material 2)

The reflective material 2 was not used.

(Reinforcing Material)

An aluminum plate having a thickness of 1 mm was cut off to 150 mm×170 mm, and a double-sided adhesive tape (#500 manufactured by NITTO DENKO CORPORATION) was stuck on whole the area of one surface thereof to form a reinforcing material.

(Assembly of Reflector for Lighting)

The reflective material 1 was stuck on a reinforcing material via a double-sided adhesive tape to obtain a reflector for lighting of 150 mm×170 mm.

Though the obtained reflector for lighting was a little inferior in installation property flexibility and installation adaptability, the reflector for lighting was excellent in luminance characteristic.

Comparative Example 6

(Reflective Material 1)

The same reflective material 1 as that of Example 6 was used.

(Reflective Material 2)

The same reflective material 2 as Example 6 was used.

(Reinforcing Material)

The reinforcing material was not used.

(Assembly of Reflector for Lighting)

The reflective material 1 and the reflective material 2 were put in order without using the reinforcing material to be evaluated as the reflector for lighting.

Though the reflector for lighting in which the reflective material 1 and the reflective material 2 were put in order had excellent luminance characteristic and installation property flexibility, the reflector for lighting was inferior in installation stability.

Example 8

(Reflective Material 1)

Figure 30:
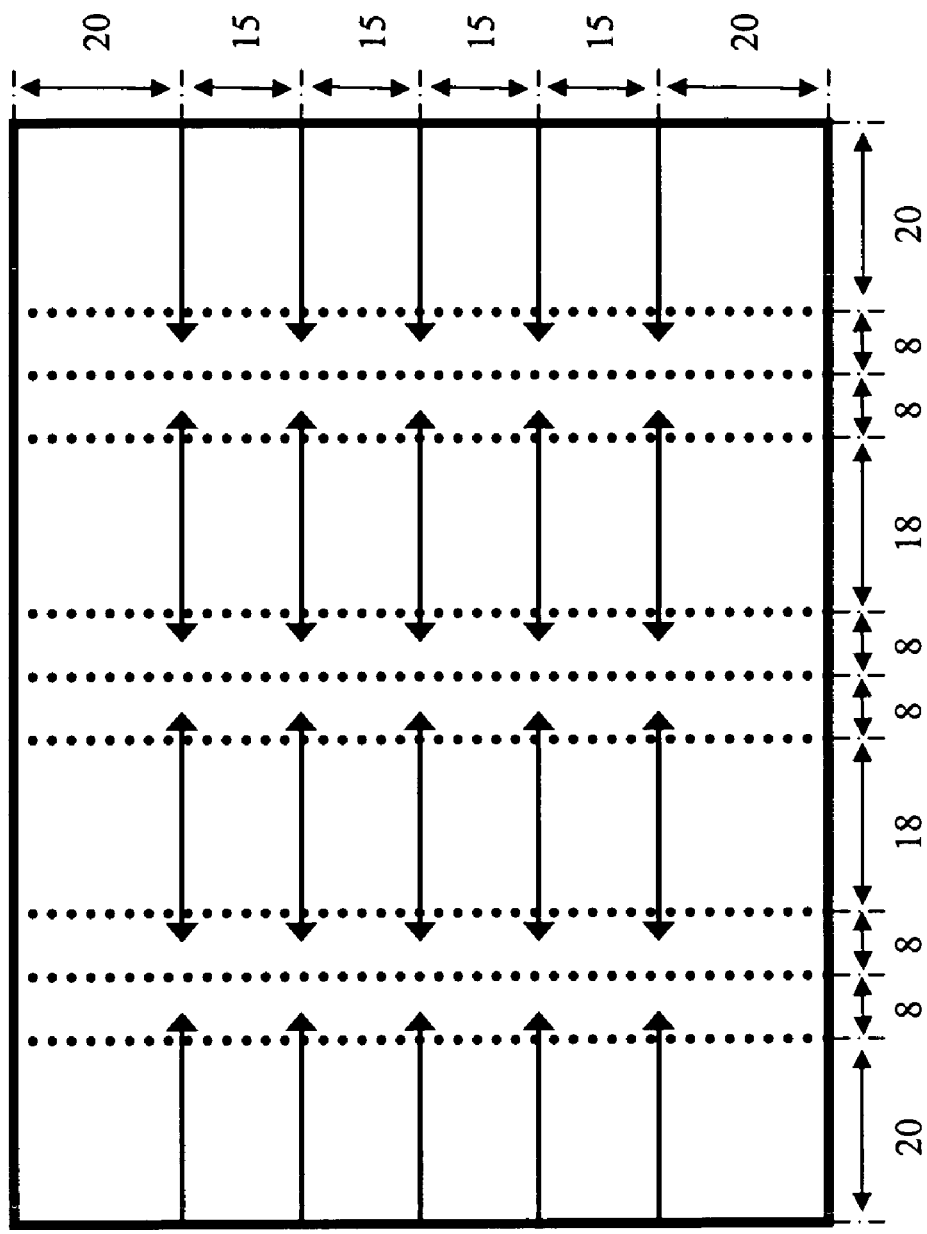
FIG. 30 is a schematic development view of a reflective material 1 of Example 8.

A material a is cut off to 100 mm×124 mm, and pressing marks were formed from the contrary side of the light-resistant agent-containing layer by pressing a ball pen having a ball diameter of 0.5 mm so as to form the shape of a straight line parallel to the long side at the positions of 20 mm (8 mm, 8 mm, 18 mm)$_2$, 8 mm, 8 mm, 20 mm (the subindex represents the number of repetitions) from the short side end to form a groove. As shown in FIG. 30, a hole having a shape of an isosceles triangle having a height of 3 mm and a base of 2 mm and a cut in a direction perpendicular to the base from the center of the base of the isosceles triangle were formed. The material was bent so that a ridge having the section shape of a regular triangle having a base of 8 mm and two sides of 8 mm is formed to form a reflective material 1 of 100 mm×100 mm.

(Other Reflective Material)

Figure 31:
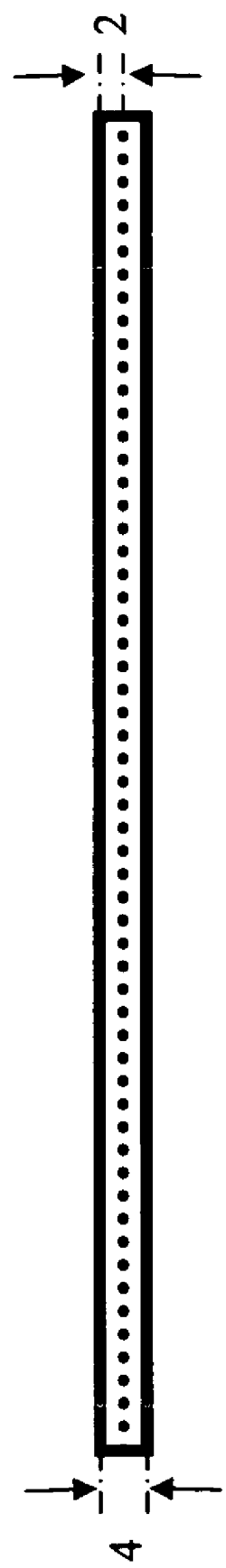
FIG. 31 is a schematic development view of a reflective material 2 of Example 8.

The material a was cut off to 100 mm×4 mm, and pressing marks were formed from the contrary side of the light-resistant agent-containing layer by pressing a ball pen having a ball diameter of 0.5 mm so that central parts of short sides facing each other are connected and the shape of a straight line parallel to the long side is formed to form a groove (refer to FIG. 31). Then, the material a was bent in a shape shown in FIG. 15 to form the other reflective material. Five reflective materials were prepared for this Example.

(Reinforcing Material)

A material b was cut off to 100 mm×100 mm, and a double-sided adhesive tape (#500 manufactured by NITTO DENKO CORPORATION) was stuck on the whole area of one surface thereof to form a reinforcing material.

(Assembly of Reflector for Lighting)

After inserting the above other reflective material into the notching part of the reflective material 1, one obtained by combining the reflective material 1 with the other reflective material was stuck via a double-sided adhesive tape on the reinforcing material to obtain a reflector for lighting of 100 mm×100 mm.

The obtained reflector for lighting showed excellent characteristic in optical dissolubility as shown in Table 3.

Example 9

(Reflective Material 1)

Figure 32:
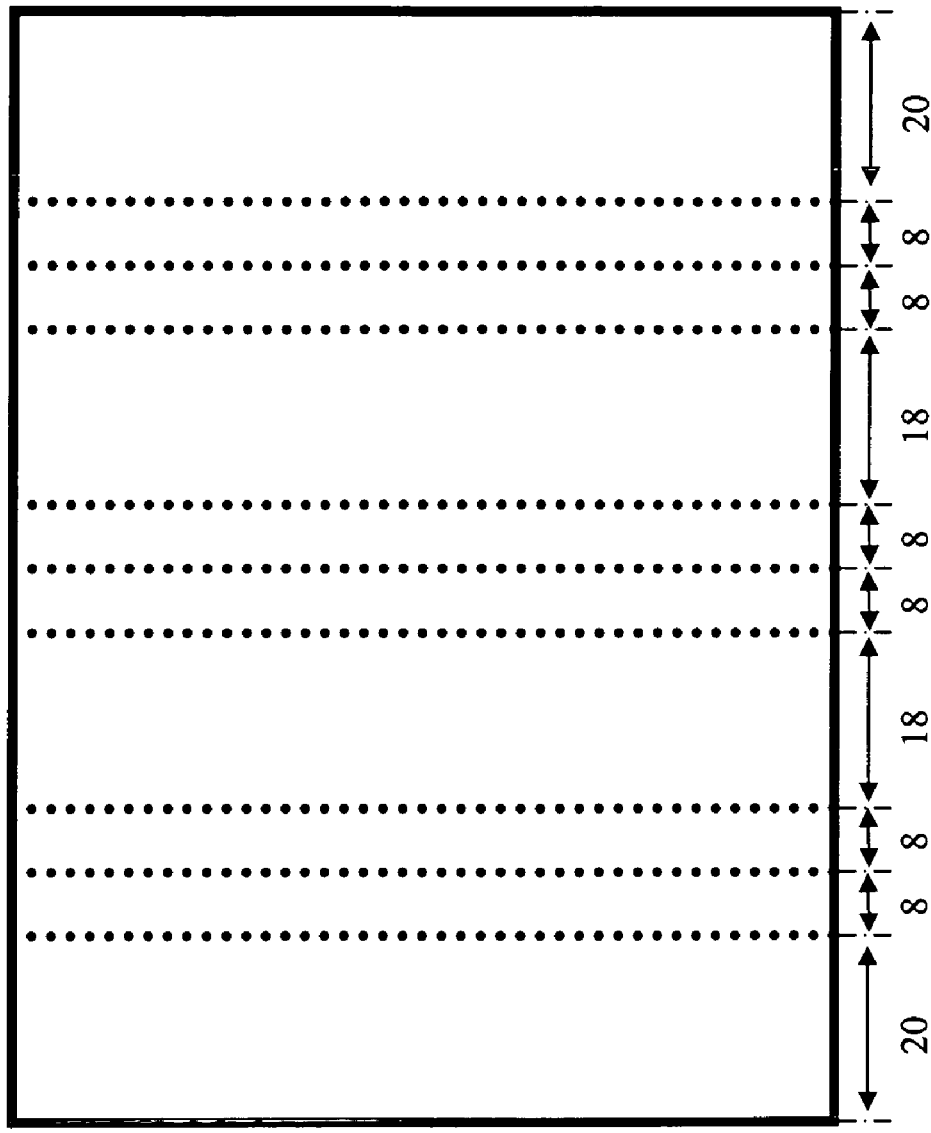
FIG. 32 is a schematic development view of a reflective material 1 of Example 9.
Figure 33:
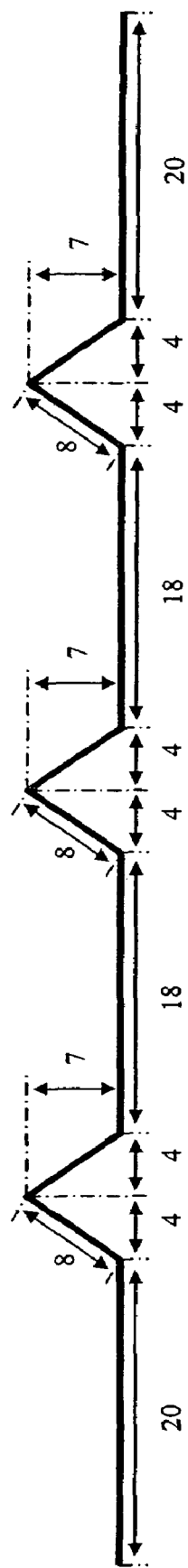
FIG. 33 is a schematic sectional view of a reflective material 1 of Example 9.
Figure 34:
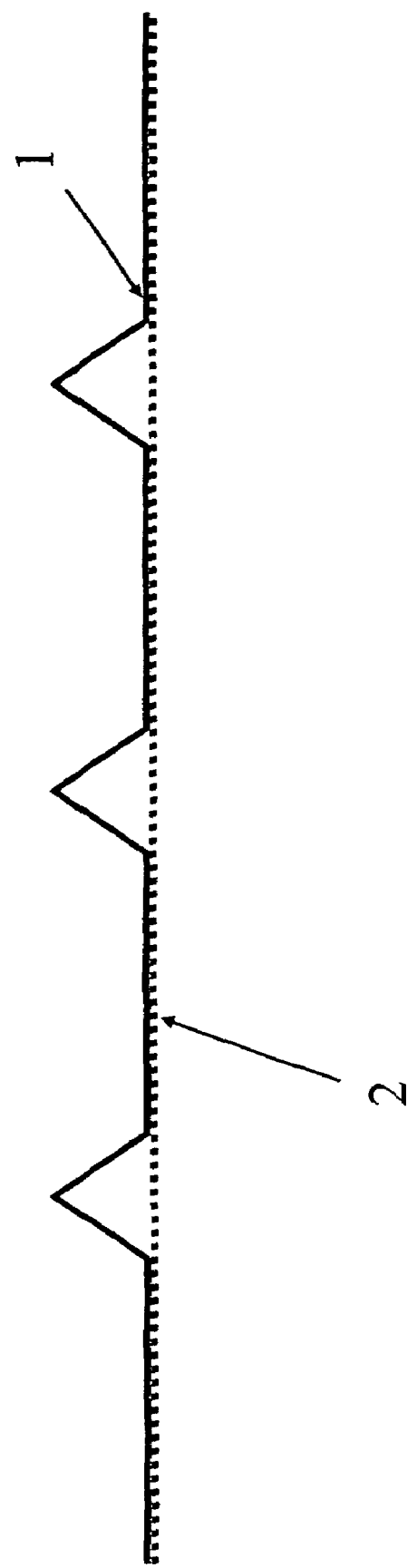
FIG. 34 is a schematic sectional view of a reflector sample for lighting of Example 9.

A material a was cut off to 100 mm×124 mm, and pressing marks were formed from the contrary side of the light-resistant agent-containing layer by pressing a ball pen having a ball diameter of 0.5 mm so as to form the shape of a straight line parallel to the long side at the positions of 20 mm, (8 mm, 8 mm, 18 mm)$_2$, (8 mm, 8 mm, 20 mm) (the subindex represents the number of repetitions) from the short side end to form a groove (refer to FIG. 32). Then, the material a was bent so that a ridge having the section shape of a regular triangle having a base of 8 mm and two sides of 8 mm is formed to form a reflective material 1 of 100 mm×100 mm as shown in FIG. 33.

(Reinforcing Material)

The same one as that of Example 8 was used.

(Assembly of Reflector for Lighting)

The reflective material 1 was stuck on a reinforcing material via a double-sided adhesive tape to obtain a reflector for lighting of 100 mm×100 mm.

The obtained reflector for lighting showed excellent characteristic in optical dissolubility as shown in Table 3.

Comparative Example 7

(Reflective Material 1)

The reflective material 1 was not used.

(Reflective Material 2)

The material a was cut off to 100 mm×100 mm to form a plane-like reflective material 2.

(Reinforcing Material)

The same one as that of Example 8 was used.

(Assembly of Reflector for Lighting)

The reflective material 2 was stuck on a reinforcing material via a double-sided adhesive tape to obtain a reflector for lighting of 100 mm×100 mm.

The obtained reflector for lighting showed inferior characteristic in optical dissolubility as shown in Table 3.

Example 10

The material a was cut off to 570 mm (long side)×450 mm (short side), and pressing marks were formed from the contrary side of the light-resistant agent-containing layer by pressing a ball pen having a ball diameter of 0.5 mm so as to form the shape of a straight line parallel to the long side at the positions of 10 mm and 60 mm from both the short sides end to form a groove.

Figure 37:
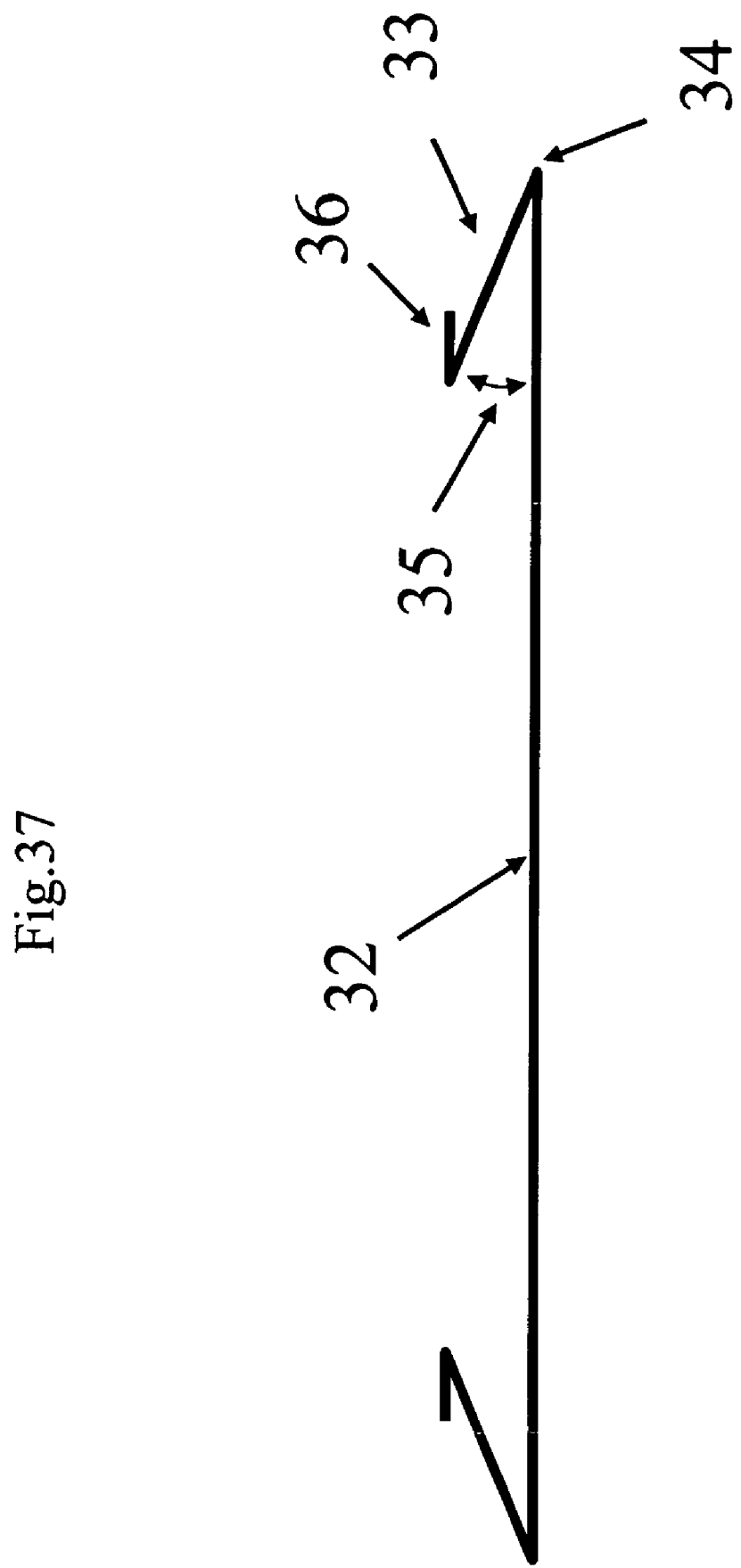
FIG. 37 is a conceptual sectional view of a reflector for lighting forming a side part continuing from a bottom part of a reflector.
Figure 38:
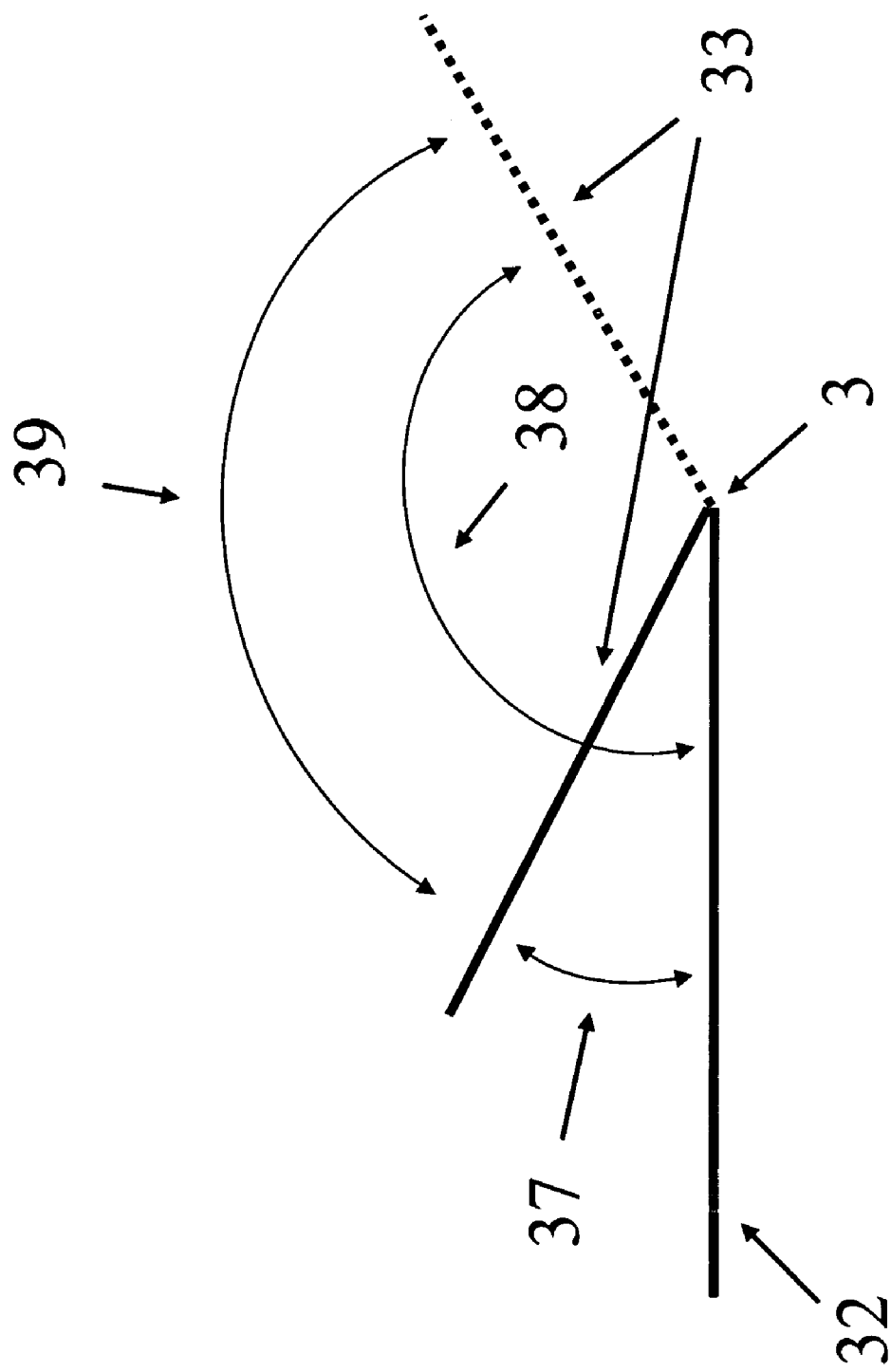
FIG. 38 is a conceptual sectional view of the opening/closing of a side part in a reflector for lighting forming a side part continuing from a bottom part of a reflector.
Figure 39:
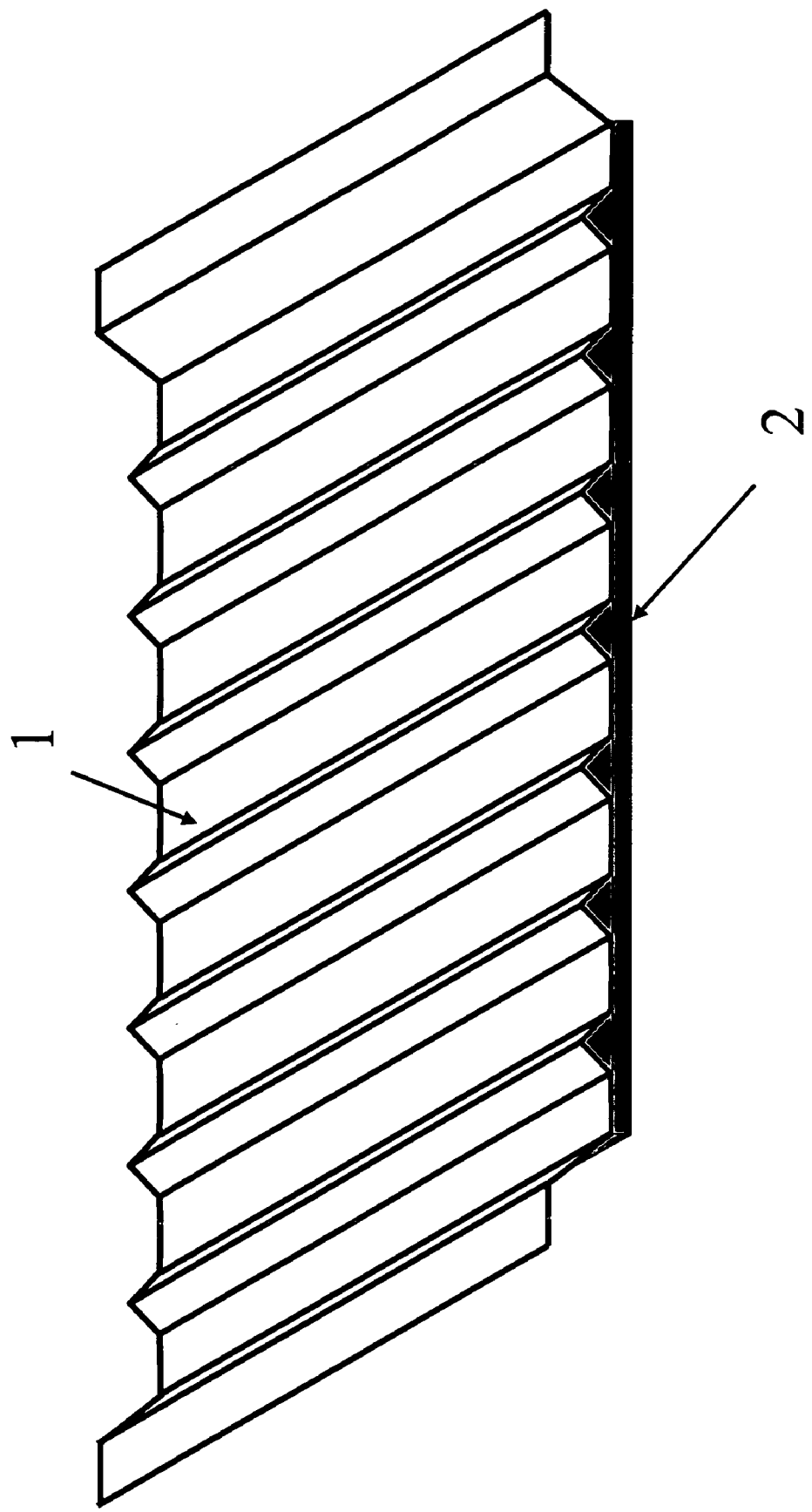
FIG. 39 is a conceptual view of an example of a reflector for lighting forming a side part continuing from a bottom part of a reflector.
Figure 40:
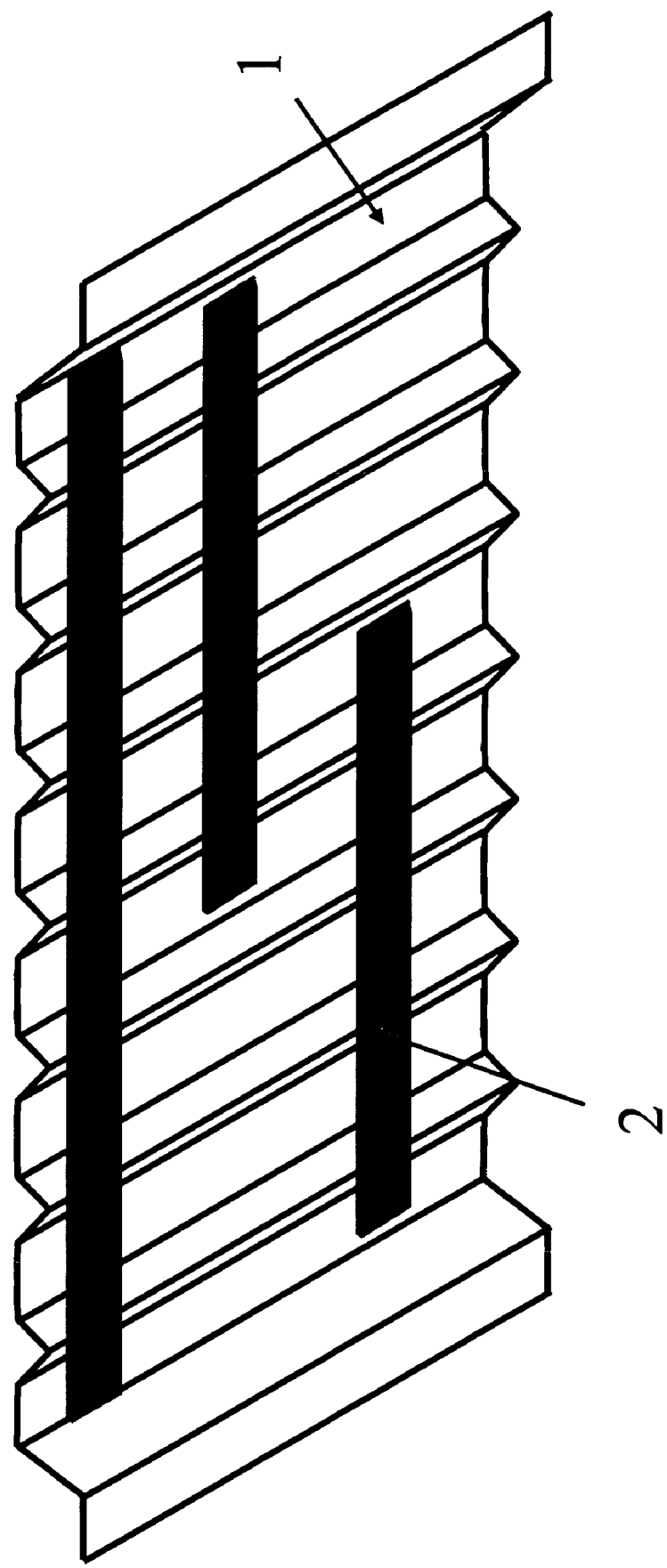
FIG. 40 is a back conceptual view of an example of a reflector for lighting forming a side part continuing from a bottom part of a reflector.

As shown in FIG. 37, the side part was formed by bending to the inner side of 150 degrees along a groove of 60 mm from both the ends of the short side, and then, an edge part was formed by bending to the outside of the 150 degrees along a groove of 10 mm from both the ends of the short side to form a reflector.

The obtained reflector had extremely excellent characteristic as shown in Table 4.

Example 11

A material d was stuck on the whole contrary side of a light-resistant agent-containing layer to the material a via a double-sided adhesive tape (# 500 manufactured by NITTO DENKO CORPORATION) to be made to compound.

The compound film was cut off to a long side of 450 mm and a short side of 570 mm. Then, after removing every 5 mm of both sides, that is, the attachment part of a material d having a width of 1 mm as a part using a straight line parallel with the long side of positions of 10 mm and 60 mm from both ends of the short side as a fold line, the back side of the material a was exposed. A groove having the shape of a cut of a depth of 0.05 mm was then formed along the fold line part.

The material a was bent as in Example 10 to obtain the reflector.

The obtained reflector had extremely excellent characteristic as shown in Table 4.

Comparative Example 8

A material b was cut off to a long side of 570 mm and a short side of 450 mm. Then, perforated line were formed on a straight line as a part using the straight line parallel with the long side of the positions of 10 mm and 60 mm from both ends of the short side as a fold line. Then, the reflector was fabricated by bending in the same manner as in Example 10.

In the obtained reflector, light leaked at an equal pitch from a boundary part. Some dimensional change occurred under heat and humidity.

Comparative Example 9

The reflector was fabricated in the same manner as in Example 10 except that the groove was not applied by the pressing of a ball pen.

Referring to the obtained reflector, wrinkles were formed on the boundary and the linearity was poor.

Comparative Example 10

A material c was stuck on the whole contrary side of a light-resistant agent-containing layer to the material a via a double-sided adhesive tape (# 500 manufactured by NITTO DENKO CORPORATION) to be made to compound.

The compound film was cut off to a long side of 570 mm and a short side of 450 mm. Then, perforated line were formed on a straight line as a part using the straight line parallel with the long side of the positions of 10 mm and 60 mm from both ends of the short side as a fold line. Then, the material was bent in the range where large damage is not formed on the boundary in the same direction as that of Example 10 to fabricate the reflector.

In the obtained reflector, light leaked in an equal pitch from the boundary part, and the opening/closing performance of the side part was also poor.

INDUSTRIAL APPLICABILITY

Since the reflector for lighting can easily obtain the three-dimensional structure reflecting any optical design corresponding to various light source shapes, the reflector for lighting can be used as an aspect particularly preferable aspect as the back light device for an display information such as the light source for signboards and the back light for liquid crystal TV.

TABLE 1

| | Fold Line Part | Reinforcing Material | Bonded Composite Material to Reflective Material | R | Dimensional Change | | Appearance Evaluation | |
|---|---|---|---|---|---|---|---|---|
| | | | | | ΔD | ΔH | Fold Line | Fold Line Surface |
| Example 1 | groove | existence | None | A | A | A | A | A |
| Example 2 | groove | existence | None | A | A | A | A | A |

TABLE 1-continued

| | Fold Line Part | Reinforcing Material | Bonded Composite Material to Reflective Material | R | Dimensional Change ΔD | ΔH | Appearance Evaluation Fold Line | Fold Line Surface |
|---|---|---|---|---|---|---|---|---|
| Example 3 | groove | existence | material e | A | A | A | A | A |
| Example 4 | — | existence | None | non-evaluation | non-evaluation | non-evaluation | C | B |
| Example 5 | perforated line | existence | material e | C | A | A | B | C |
| Comparative Example 1 | peforated line | none | None | A | C | C | B | A |
| Comparative Example 2 | — | none | aluminum plate | C | A | A | A | A |

TABLE 2

| | Front Luminance Characteristic (%) | | | | |
|---|---|---|---|---|---|
| | Bottom Luminance Average Value/ Peak Luminance Average Value | Average Luminance/ Peak Luminance Average Value | Installation Property Flexibility | Installation Stability | Installation Adaptability |
| Example 6 | 12 | 30 | A | A | A |
| Example 7 | 11 | 28 | A | A | A |
| Comparative Example 3 | 11 | 29 | A | A | B |
| Comparative Example 4 | 10 | 27 | A | A | A |
| Comparative Example 5 | 11 | 30 | B | A | B |
| Comparative Example 6 | 11 | 29 | A | B | — |

TABLE 3

| | Z |
|---|---|
| Example 8 | 0.28 |
| Example 9 | 0.21 |
| Comparative Example 7 | 0.15 |

TABLE 4

| | Boundary Part | Reflective Material | Opening/ Closing Performance of Side Part | Appearance Evaluation Fold Line Shape | Light Leak | Dimensional Change ΔW/W0 | ΔL/L0 |
|---|---|---|---|---|---|---|---|
| Example 10 | groove | one sheet article | A | A | A | A | A |
| Example 11 | groove | composite article | A | A | A | A | A |
| Comparative Example 8 | perforated line | one sheet article | A | B | B | B | B |
| Comparative Example 9 | — | one sheet article | B | C | A | — | — |
| Comparative Example 10 | perforated line | composite article | C | B | B | — | — |

The invention claimed is:

1. A reflector for lighting comprising:
   a reflective material made of a polymer membrane of which an average reflectance of 400 to 700 nm wavelength of at least one surface side is 85% or more and having a ridge-shaped uneven shape; and
   a reinforcing material having flexibility, wherein the reinforcing material connects bottom parts of concave parts with each other from a back side of a side of the one surface side of the reflective material to reinforce the uneven shape.

2. The reflector for lighting according to claim 1, wherein the reflective material and the reinforcing material are made of a polyester film.

3. The reflector for lighting according to claim 1, wherein the reflective material has a groove formed on at least a back side of an edge line part of a convex part.

4. The reflector for lighting according to claim 1, wherein the reflector contains a plurality of reflective materials.

5. The reflector for lighting according to claim 4, wherein the reflector contains a plurality of reflective materials.

6. The reflector for lighting according to claim 4, further comprising a reflective material made of a polymer membrane of which an average reflectance of 400 to 700 nm wavelength of at least one surface side is 85% or more and having no ridge-shaped uneven shape.

7. The reflector for lighting according to claim 4, wherein the reflector contains a connection material for connecting a plurality of reflective materials.

8. The reflector for lighting according to claim 7, wherein the reflective material, the reinforcing material and the connection material are made of a polyester film.

9. The reflector for lighting according to claim 1, wherein the reflective material made of the polymer membrane of which the average reflectance of 400 to 700 nm wavelength of at least one surface side is 85% or more forms a side part continuing from the bottom part of the reflector, and has a groove formed on the back side of the one surface side on the boundary of the bottom part and the side part.

10. A reflector for lighting, comprising a reflective material made of the polymer membrane of which the average reflectance of 400 to 700 nm wavelength of at least one surface side is 85% or more, forming a side part continuing from the bottom part of the reflector, and having a groove formed on the back side of the one surface side on the boundary of the bottom part and the side part.

11. A back light device for displaying information using the reflector for lighting according to any one of claims 1 or 10.

* * * * *